United States Patent
Amann

(10) Patent No.: US 10,430,754 B2
(45) Date of Patent: Oct. 1, 2019

(54) MONITORING PARTS IN A FACILITY

(71) Applicant: The Weir Group PLC, Fort Worth, TX (US)

(72) Inventor: Andrew Amann, Wakefield, MA (US)

(73) Assignee: WEIR GROUP IP LIMITED, Glasgow (GB)

( * ) Notice: Subject to any disclaimer, the term of this patent is extended or adjusted under 35 U.S.C. 154(b) by 123 days.

(21) Appl. No.: 15/230,386

(22) Filed: Aug. 6, 2016

(65) Prior Publication Data

US 2017/0041452 A1 Feb. 9, 2017

Related U.S. Application Data

(60) Provisional application No. 62/202,764, filed on Aug. 7, 2015, provisional application No. 62/202,762, filed on Aug. 7, 2015, provisional application No. 62/202,761, filed on Aug. 7, 2015.

(51) Int. Cl.

| | |
|---|---|
| *G06Q 10/08* | (2012.01) |
| *H04W 4/80* | (2018.01) |
| *H04B 17/27* | (2015.01) |
| *H04W 4/02* | (2018.01) |
| *H04B 17/318* | (2015.01) |
| *H04W 4/70* | (2018.01) |
| *H04W 4/029* | (2018.01) |
| *H04W 4/33* | (2018.01) |
| *H04W 4/04* | (2009.01) |

(Continued)

(52) U.S. Cl.
CPC ........... *G06Q 10/087* (2013.01); *H04B 17/23* (2015.01); *H04B 17/27* (2015.01); *H04B 17/318* (2015.01); *H04W 4/023* (2013.01); *H04W 4/029* (2018.02); *H04W 4/043* (2013.01); *H04W 4/06* (2013.01); *H04W 4/33* (2018.02); *H04W 4/70* (2018.02); *H04W 4/80* (2018.02)

(58) Field of Classification Search
None
See application file for complete search history.

(56) References Cited

U.S. PATENT DOCUMENTS

| 2007/0114280 A1* | 5/2007 | Coop | G06Q 10/08 235/385 |
|---|---|---|---|
| 2007/0194921 A1* | 8/2007 | Watanabe | G06K 7/0008 340/572.1 |

(Continued)

*Primary Examiner* — Alejandro Rivero

(57) ABSTRACT

Parts in a manufacturing or service facility are electronically tracked using wireless beacons and location tags, strategically positioned receiver devices in the facility, and a monitoring server. The wireless beacons and location tags are individually coupled to parts in the facility to be tracked and store beacon-, tag-, and part-specific identifiers that can be wirelessly communicated to the monitoring server through receiver devices or mobile devices of workers in the facility. In particular, the location tags transmit various identifiers when the mobile devices or wireless beacons are brought into close proximity to the location tags. The mobile devices allow workers to request on-demand and up-to-date work orders for the parts with location tags, and the wireless beacons communicate the location tags' identifiers to the monitoring server. The monitoring server uses the identifiers to track the locations of the parts and manage electronic work orders for the parts.

20 Claims, 16 Drawing Sheets

(51) Int. Cl.
*H04W 4/06* (2009.01)
*H04B 17/23* (2015.01)

(56) References Cited

U.S. PATENT DOCUMENTS

| | | | | |
|---|---|---|---|---|
| 2009/0037244 A1* | 2/2009 | Pemberton | ........... | G06Q 10/087 |
| | | | | 705/28 |
| 2013/0233922 A1* | 9/2013 | Schoening | ........... | G06Q 10/087 |
| | | | | 235/385 |
| 2014/0125501 A1* | 5/2014 | Baade | ................ | G01S 19/16 |
| | | | | 340/989 |
| 2015/0350817 A1* | 12/2015 | Huntington | ........... | H04W 4/008 |
| | | | | 455/41.1 |

* cited by examiner

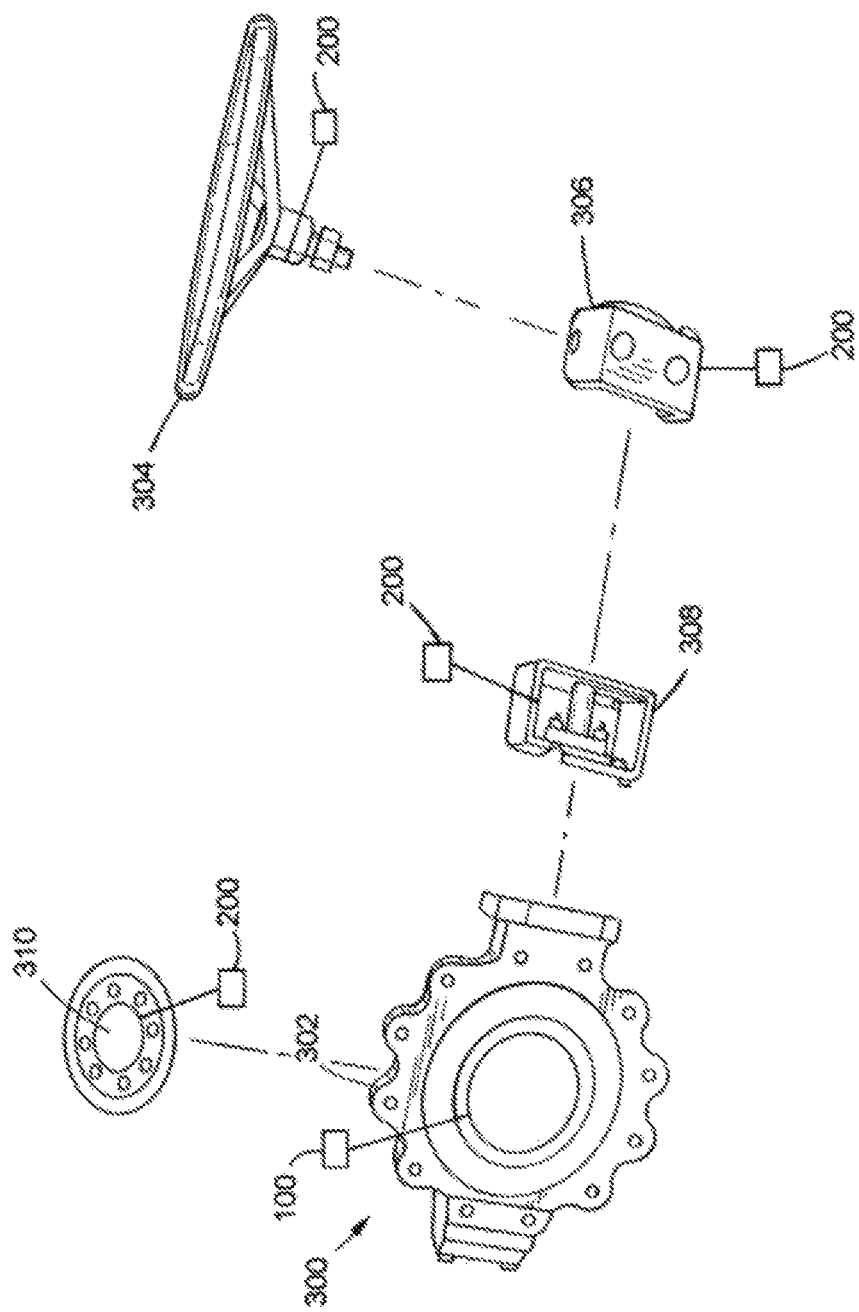

| | | | | | | |
|---|---|---|---|---|---|---|
| Week 201537 | CO# 0010000237-142 | Item Code BTOT06ASGEN006 | Item Description TRI BF 006-150 WCB LG PNEUM | | | Valve Body |
| Customer | | | Departure Date 10/02/15 | CO Rq. Date 01/01/16 | Est. Work Date 09/18/15 | CO Qty 1.00 | Body: 31/91201S002 Order Type: PO Order No: 2020493 |
| Order Destination | Order 0256659-0 | Facility: ABC | MO/PO Plan Date 09/18/15 | MO/PO Qty 1.00 | Planner Manbuyer | W/SPV AAMANN |
| ITEM | Description | Make/Buy | Avail. Oper. | MO/PO/PI Order Date | MO/PO/PI Qty | Invoice Cost |
| 21147451S001 | Coiled SPG Pin 1/4X5/8 | P | Available | | 1.00 | 187.00  134.00 |
| 21261009S003 | Lockwasher 1/4 Reg SST | P | Available | | 8.00 | 866.00  536.00 |
| 21261013S002 | Lockwasher 1/2 Reg ZNP | P | Available | | 4.00 | 432.00  352.00 |
| 21267109S001 | Lockwasher M10 Steel | P | Available | | 4.00 | 100.00  88.00 |
| 21381011S001 | Drive Screw #4X1/4 | P | Available | | 4.00 | 978.00  152.00 |
| 21654189S001 | Hex Capscrew 1/2X1.5 | P | Available | | 4.00 | 112.00  100.00 |
| 21655002S002 | Hex Capscrew 1/4X1/2 | P | PO | 2022013 43 12/31/15 | 8.00 | 179.00  -145.00 |
| 21655187S002 | Hex Capscrew 1/2X1.25B8M | P | PO | 2022013 50 12/31/15 | 4.00 | 189.00  -51.00 |
| 21673005S004 | Hex Nut 1/2 SST.8M | P | PO | 2022013 55 12/31/15 | 2.00 | 288.00  -198.00 |
| 22254617S001 | Hex Capscrew M102X35, Full THD | | Available | | 4.00 | 96.00  84.00 |

FIG. 13

MONITORING PARTS IN A FACILITY

CROSS REFERENCE TO RELATED APPLICATIONS

This application claims the benefit of U.S. Provisional Application Ser. No. 62/202,761 filed on Aug. 7, 2015 and entitled "MONITORING PARTS IN A FACILITY"; U.S. Provisional Application Ser. No. 62/202,762 filed on Aug. 7, 2015 and entitled "TRACKING PARTS IN MANUFACTURING AND SERVICE FACILITIES"; and U.S. Provisional Application Ser. No. 62/202,764 filed on Aug. 7, 2015 and entitled "PRESENTATION OF REAL-TIME LOCATIONS OF PARTS IN A MANUFACTURING OR SERVICE FACILITY." These three provisional patent applications are hereby incorporated by reference in their entirety for all intents and purposes.

TECHNICAL FIELD

This disclosure generally relates to tracking parts in a manufacturing or service facility and, more specifically, to using electronic tags to identify the locations of parts in relation to different work areas in the facility and electronically monitor the parts through the manufacturing or servicing processing using near-field communication (NFC) or other radio-frequency identification (RFID) tags.

BACKGROUND

To function efficiently, manufacturing and service facilities depend on getting the right component part to the right worker at the right time. Modern facilities are typically divided into different work areas (e.g., receiving, welding, assembly, shipping, etc.), and parts are brought to specialized workers in those areas to perform a job function. Many inefficiencies result from the logistics involved with moving parts around a facility floor. If the correct part is not in the appropriate work area at the right time, a worker wastes time tracking the part down in the facility.

Today's manufacturing and service facilities use paperwork to detail job tasks needing to be performed to build or service a particular part. Using paperwork to track part manufacturing and service job tasks is cumbersome, inaccurate, and often requires more time finding and keeping the paperwork up to date than manufacturing or servicing the part. A worker typically has to locate the appropriate paperwork, update it correctly when a specific job task is performed, and then ensure it stays with the part as the part travels to the next work area. Such a process is only as good as the workers who maintain the accuracy of the paperwork, and even the best workers typically cannot ensure the appropriate paperwork always follows all parts in the facility. Countless man hours are wasted tracking such paperwork and keeping it up to date. And the typical reaction of management to improve the efficiency of the process is to add additional paperwork or perform additional administrative tasks, most of which further complicate and delay things.

The paperwork includes manufacturing drawings for the various stages of production. The manufacturing drawings are printed in large format and include tolerances for the part. Oftentimes the manufacturing drawings are updated by the engineering team while the part is currently out on the shop floor. The updated manufacturing drawings then need to be placed with the part on the shop floor so the part can be manufactured according to the updated drawing parameters. If the part has already been machined beyond the updated tolerances, then the part may need to be scrapped resulting in a complete loss of the part and machining costs. Moreover, if the updated drawings do not end up being placed with the proper part, the part is not machined properly, which could result in failure or even catastrophic failure during operation as many of the parts manufactured are in hazardous operational conditions (high pressure, flooding, nuclear environments).

Even worse, worker productivity is drastically reduced when workers must search for parts that are not in the correct work areas or must hunt down corresponding paperwork detailing tasks that need to be completed on the part. For example, welders hunting for paperwork or parts in a manufacturing facility spend less time actually welding. The end goal of any manufacturing or service facility is to maximize the amount of time specialized workers spend performing their specialized job tasks. Miring workers down with administrative paper tasks or part-hunting expeditions reduces the time spent actually manufacturing and servicing parts.

SUMMARY

This Summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

One embodiment includes a method for tracking parts in a facility. The method includes storing a beacon identifier in a wireless beacon coupled to a first part, retrieving a tag identifier stored in a location tag coupled to a second part, creating a location signal including the beacon identifier and the tag identifier, and transmitting the location signal in the facility.

One embodiment includes retrieving a part identifier from the location tag and adding the part identifier to the location signal, with the part identifier being unique to the second part.

One embodiment includes submitting the part identifier to a monitoring server in a request for work orders related to the second part, receiving at least one work order related to the second part, and presenting on a mobile device the at least one work order related to the second part to a user.

One embodiment includes submitting the tag identifier to a monitoring server in a request for work orders related to the second part, receiving at least one work order related to the second part, and presenting on a mobile device the at least one work order related to the second part to a user.

One embodiment includes transmitting the wireless signal to receiver devices in the facility through a Bluetooth LE or Bluetooth Smart transmission.

One embodiment includes retrieving the tag identifier from the location tag through a near-field communication transmission.

One embodiment is directed to receiving the location signal from a receiver device, determining the location of the second part based on the location signal, and updating or creating a work order for the second part based on the location signal or the location of the second part.

One embodiment includes transmitting the work order to a mobile device.

In one embodiment, the first part or the second part include at least member of a group including: a fluid end, a swivel, a joint, a valve, a hose, a conduit, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, a casing head, a tubing head, a positive displacement pump, a hydrocylcone, a dewatering pump, a vortex pump, a trailer, a conveyor, a screening machine, a material handling machine, a communition machine, a feeder, a crusher, a modular plant, a barge, and a control valve.

One embodiment includes retrieving a first part identifier of the first part from the wireless beacon, retrieving a second part identifier of the part from the location tag, and including the first part identifier and the second part identifier in the location signal being transmitted.

One embodiment includes determining locations of the first part and the second part based on the location signal.

One embodiment includes presenting the locations of the first part and the second part on a mobile device or a computing device.

One embodiment includes presenting the locations of the first part and the second part in a user interface showing real-time locations of a plurality of tracked parts in the facility.

One embodiment includes modifying a second work order associated with a third part based on the location of the first or second part.

In one embodiment, the tag identifier is a media access control address specific to the location tag.

One embodiment is directed to computer-storage media with stored computer-executable instructions configured to cause one or more processors to track locations of parts in a facility. The computer-storage media include: location signals of a wireless beacon that are received from a plurality of receiver devices over a network, wherein the location signals each include a beacon identifier of the wireless beacon coupled to a first part and a tag identifier of a location tag coupled to a second part; and a part location component configured to use the location signals to determine real-time locations of the first part and the second part and store the real-time locations of the first part and the second part in association with the wireless beacon and the tag identifier.

One embodiment includes transmitting the real-time locations of the first part and the second part to a computing device for display.

In one embodiment, the real-time locations include work areas in the facility.

In one embodiment, the work areas include at least one member of a group include a welding work area, an assembly work area, a machining work area, and a shipping work area.

In one embodiment, location signals include at least one part identifier related to the first part or the second part.

In one embodiment, the location tag includes an RFID tag. In one embodiment, the location tag includes an NFC tag.

Another embodiment is recited to a method that includes: broadcasting a radio frequency (RF) retrieval signal to a location tag capable of energizing a transmitter on the location tag to transmit a tag identifier specific to the location tag or a part identifier specific to a part coupled to the location tag, receiving the tag identifier or the part identifier, generating a work-order request that includes the tag identifier or the part identifier, transmitting the work-order request over a network, receiving a work order from a monitoring server in response to the work-order request, and presenting the work order on a display.

In one embodiment, the transmitter is an NFC transmitter.

In one embodiment, the tag identifier or the part identifier are received wirelessly across a communicable distance of less than six inches or 153 millimeters.

One embodiment includes presenting the work order on a mobile device and receiving user input on the mobile device from a user interacting with the work order.

One embodiment includes transmitting the user input to the monitoring server and modifying the work order based on the user input.

One embodiment includes transmitting the user input to the monitoring server and modifying a second work order associated with another part based on the user input.

Another embodiment includes computer-storage embodied with computer-executable instructions operable to perform a method of tracking parts in a facility. The method includes receiving location signals with a tag identifier specific to a location tag or a part identifier specific to a first part coupled to the location tag from a wireless beacon coupled to a second part, determining a real-time location of the first part using either tag identifier or the part identifier in the location signals from the wireless beacon, and storing the real-time location of the first part.

In one embodiment, the real-time location of the first part is determined through triangulation of receiver devices in the facility transmitting the location signals.

Another embodiment is directed to a method that includes receiving at a location tag coupled to a first part in the facility, a retrieval signal from a wireless beacon coupled to a second part in the facility; and using power of the retrieval signal to energize a transmitter of the location tag to transmit a tag ID specific to the location tag or a part ID specific to the first part.

Another embodiment is directed to a monitoring server that includes: memory for storing tag identifiers or part identifiers stored on location tags coupled to parts in a facility, a part location component configured to determine real-time locations of the parts in the facility based on the tag identifiers or the part identifiers stored in the memory, and a work order component configured to select work orders for transmission in response to work-order requests submitted by mobile devices.

DESCRIPTION OF DRAWINGS

The accompanying drawings facilitate an understanding of the various embodiments.

FIG. 3A is an exploded-view diagram of a part with a coupled wireless beacon in accordance with some of the disclosed embodiments.

FIG. 13 is a diagram of a user interface presenting a graphical representation of a work order for a part that has been identified by a mobile device in accordance with some of the disclosed embodiments.

DETAILED DESCRIPTION

Figure 1:
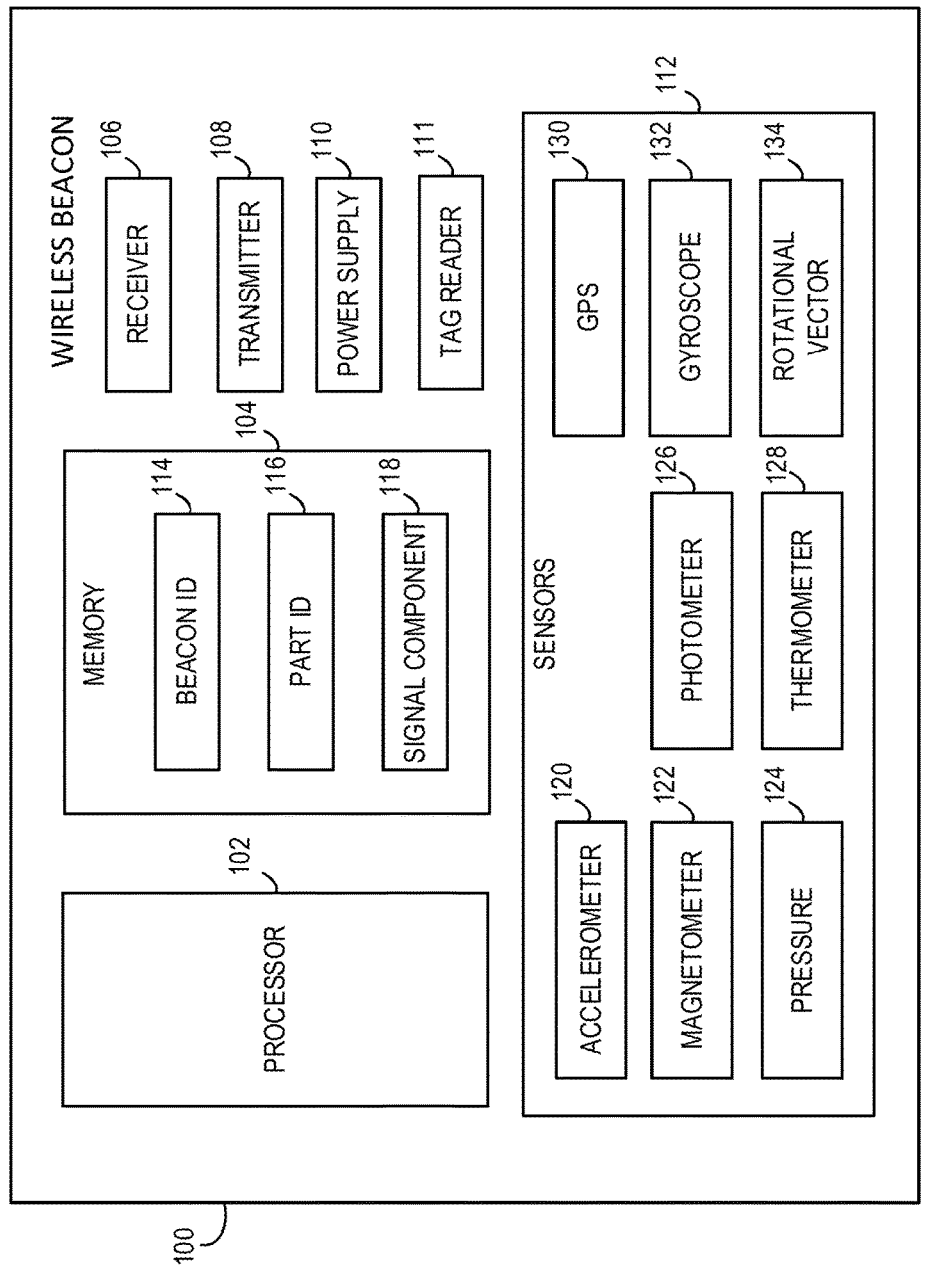
FIG. 1 is a block diagram of a wireless beacon in accordance with some of the disclosed embodiments.

Embodiments disclosed herein generally relate to systems, methods, devices, and computer storage media for tracking parts in a manufacturing or service facility and providing workers with on-demand and up-to-date work orders for the tracked parts. In one embodiment, parts in the facility are equipped with location tags storing tag identifiers ("tag IDs") and/or part identifiers ("part IDs") that can be read on demand by mobile devices of workers. The location tags are coupled to parts in the facility. Once the tag IDs or part IDs are read, the mobile device can retrieve from a server up-to-date work orders for the parts coupled to the location tags. The work orders may indicate various job tasks, component parts, or other manufacturing or service specifics about the parts.

The location tags may also be used to track locations and assembly of the parts in the manufacturing or service facility. Some of the parts in the facility may be outfitted with wireless beacons equipped with location tag readers that retrieve the tag IDs or part IDs from the location tags when the location tags are brought within a communicative location distance to the wireless beacons. The mobile devices wirelessly transmit locations signals containing retrieved tag IDs and/or part IDs to network-connected receiver devices that are strategically positioned throughout the facility in different work and sub-work areas of the facility. In one embodiment, the network-connected receiver devices transmit the location signals across a public or private network to a monitoring server that interprets the receipt by the wireless beacons of the tag or part IDs to indicate that two parts have been assembled together. For example, a wireless beacon on a valve body may receive IDs from an NFC tag of a valve disc when the two parts are brought into close contact (e.g., within an NFC distance) to each other, and a server may then be configured to determine that the valve body's wireless beacon transmission of the IDs stored in the NFC tag of the valve indicate that the two have been assembled together.

Additionally, in some embodiments, the mobile device may also be configured to transmit user input of completed work tasks back to the server, providing the server with up-to-date information about the parts. For example, a machinist on a shop floor may "touch" a mobile device to a part's NFC tag to retrieve a tag or part ID that can be used to identify the part. The touched mobile device may then execute an application to transmit the retrieved tag or part ID to a server, receive a list of machining tasks to perform on the part from the server, receive inputs from the machinist confirming the tasks have been completed, and transmit notifications that the particular tasks have been completed to the server. The server may then update later-issued work orders for the part or the work orders of other parts scheduled to be assembled to the part to account for the completed machining tasks. For instance, the part may be directed to another work area (e.g., assembly, shipping, etc.) based on completion of the machining, or drawings for welding to be completed may be updated to account for the machining performed on the part. Or, in another example, the part may be ordered back to a machining work area due to the performed machining eliminating more than a threshold amount of the part.

Parts may be tracked throughout the facility using the techniques, systems, methods, and computer-storage disclosed in the provisional patent application concurrently filed on Aug. 7, 2015, entitled "TRACKING PARTS IN MANUFACTURING AND SERVICE FACILITIES," filed by the Applicant, and having the same inventor as this application. Additionally, some embodiments may generate and present users with the user interfaces (UIs) disclosed in the provisional patent application concurrently filed on Aug. 7, 2015, entitled "PRESENTATION OF REAL-TIME LOCATIONS OF PARTS IN A MANUFACTURING OR SERVICE FACILITY," filed by the Applicant, and having one joint inventor in common with this application. Both concurrently filed provisional applications are incorporated herein by reference in their entirety for all purposes and are referenced herein collectively as the "Concurrently Filed Applications."

The embodiments discussed herein may be implemented in various manufacturing, service, wholesale, and retail facilities. In one example, a manufacturing facility may use the various embodiments herein to track parts being assembled therein. In another example, a service facility may use embodiments disclosed herein to track parts being fixed, inspected, or otherwise serviced. In other examples, retail facilities may use the disclosed embodiments to track goods being stored or displayed. For the sake of clarity, instead of having to constantly mention all of the possible facilities throughout this disclosure, embodiments are discussed in a manufacturing facility to aid the reader with the understanding that such embodiments may equally be used in other types of facilities as well. Thus, the embodiments disclosed in a manufacturing facility may be used in a servicing facility, retail facility, wholesale facility, or other facility.

The manufacturing facilities discussed herein have separate work areas, and each work area may include one or more sub-work areas. As referred to herein, a "work area" is an area in a manufacturing facility in which a particular work operation is performed. Examples of work areas include, without limitation, an intake area, a welding area, a machining area, an assembly area, a curing area, a painting area, a molding area, a programming area, a testing area, an inspection area, a shipping area, or any other area used to manufacture a completed part.

Work areas themselves may include one or more sub-work areas. For example, a welding area may include a holding sub-work area where parts needing to be welded are held, a welding sub-work area where welding is performed, an inspection sub-work area where welds are inspected, and an outtake sub-work area where welded parts are placed before moving to other areas. In another example, an assembly work area may include intake and outtake sub-work areas and several assembly sub-work areas where parts are attached along a manufacturing line. For instance, a first rotor may be moved to a first assembly sub-work area, the rotor is later fastened to a stator in a second assembly sub-work area, a second rotor is moved to a third sub-work area, and so forth. Additional examples of work areas and sub-work areas are too numerous to list here, and need not be exhaustively provided to understand the various embodiments disclosed. But it should at least be noted that embodiments may monitor the sub-work areas and the work areas to understand when parts are moving in and out of both.

Some of the embodiments disclosed herein track parts in a facility by their real-time locations in the various work areas and/or sub-work areas of a manufacturing facility. Additionally or alternatively, the historic locations of parts in various work areas and sub-work areas of a manufacturing facility may also be tracked. For example, one embodiment may track every work area and sub-work area through which a part has passed, and this historical location data about the part may be analyzed to determine specific bottlenecks in the manufacturing process, estimate delivery times of orders, forecast facility capacity, or determine other useful metrics related to the manufacturing or servicing facility.

Work areas and sub-work areas may all be contained within one facility (in some embodiments) or may be contained within multiple structures (in other embodiments). Even when contained in a single facility, the work areas may be included on different floors, in different rooms, or in various separated areas of the structures. For example, welding and assembly of parts may take place on a large shop floor. Whereas, parts may be received at an intake area in a separate room of the facility, or in an entirely other building structure of the facility. In another example that tracks parts across multiple structures, assembly and welding of a part may occur in a facility in Fort Worth, Tex., but the part may be programmed in another facility in Ipswich, Mass. The tracking techniques used herein may be configured to monitor the part in both facilities. Thus, embodiments disclosed herein may be used to track parts through a single structure, at different structures, or through separate rooms and floors of structures.

Any part in a manufacturing, service, wholesale, or service facility may be tracked using the various techniques and devices disclosed herein. Some specific embodiments focus on the tracking of parts in the oil-and-gas, power, mineral-extraction, and similar industries of manufacturing. Example parts that may be tracked in a manufacturing facility using the embodiments disclosed herein include, without limitation: fluid ends, swivels, joints, valves, hoses, conduits, manifold trailers, safety iron, safety hammers, dart valves, plug valves, clapper check valves, pressure relief valves, emergency unloading valves, gate valves, subsea dosage valves, hydraulic valves, valve seats, butterfly valves, steadseal valves, hyperseal valves, Polytetrafluoroethylene-lined valves, swingthrough valves, rubber-sealing and rubber-line valves, fire safe valves, swing and lift check valves, T-pattern globe valves, Y-pattern globe valves, three-way globe valves, compressor check valves, cold reheat check valves, cold heat check valves, testable check valves, reverse current valves, parallel slide valves, gate valves, safety valves, safety relief valves, isolation valves, relief valves, mounted-ball valves, ball valves, diaphragm valves, gate and globe valves, check valves, lift check valves, swing check valves, steam isolation valves, feedwater isolation valves, integrated safety valves, single-stage turbines, multi-stage turbines, hydraulic turbines, pump turbines, quad-runner turbines, gear operators, pneumatic actuators, pressure control panels, lifting clamps, flow line safety restraints, chokes, drop ball injectors, pumps, blowout preventers, gas separators, overshot connectors, wellheads, frac pumps, manifold systems, fluid end systems, slurry pumps, water pumps, subsea pumps, premix tanks, frac trees, swellable packers, manifold skids, tubing heads, wellheads, rod rotators, stuffing boxes, casing heads, tubing heads, control valves, positive displacement pumps, hydrocyclones, dewatering pumps, vortex pumps, trailers, conveyors, screening machines, material handling machines, communition machines, feeders, crushers, modular plants, barges, and any other additional manufactured or serviced parts. A part as listed herein can refer to individual parts or components of an assembled product. For example, a part may be a larger assembly or parts therefore; for example, but not limitation, a pump, a machine, a plant, means the larger assembly or the individual parts comprising the larger assembly. Though such a list is lengthy, it is not exhaustive. Other parts in manufacturing and service facilities may alternatively be tracked using the embodiments disclosed herein.

To aid the reader, a running example is discussed throughout this disclosure of wireless beacons being coupled to a "valve body," which is one constituent part of a valve that, when combined with other constituent valve parts (e.g., a disc, a hand wheel, an actuator, a shaft, etc.) forms an assembled valve. Other parts—including those previously stated, equivalents thereof, or other manufactured or serviced parts—may be tracked in a manufacturing facility using the systems and techniques described herein. For the sake of clarity, however, an exemplary valve body is referred to throughout this disclosure as a part to further illuminate some of the disclosed embodiments.

Embodiments disclosed herein may generally be described in the context of computer-executable instructions, such as program modules, executed by one or more computing devices in software, firmware, hardware, or a combination thereof. The computer-executable instructions may be organized into one or more computer-executable components or modules. Generally, program components and modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. Moreover, in examples involving a general-purpose computer, aspects of this disclosure transform the general-purpose computer into a special-purpose computing device when configured to execute the instructions described herein.

Embodiments disclosed herein communicate "work orders" for parts to a user. Work orders, as referenced herein, include a digital representation of a manufacturing or service order and may include various data, including for example but without limitation: customer information, order information, drawings (e.g., welding, machining, assembly drawings), job tasks, part identifiers, part types, part descriptions, shipment information, additional parts for assembly, additional part availability, part work area locations, purchase order information, quality control metrics, part testing data (e.g., pressure testing, wall-thickness testing, etc.), or any other information related to the manufacturing or service of the part. Work orders may also include information about the assigned or previous workers of a part, including, for example, the worker names, job task performance time, job task quality, supervisor name, or other indication of staff. Examples of work orders are shown in some of the accompanying UI figures referenced herein.

Having briefly described an overview of some of the disclosed embodiments and generally defined various terminology used throughout this disclosure, the accompanying figures and corresponding disclosure below describe additional aspects of some of the embodiments disclosed herein. The following figures are provided merely to illustrate aspects of some of the disclosed embodiments and are not meant to limit all embodiments to any particular configuration of sequence of steps. Also, technically equivalent configurations, facilities, and work flows will be readily apparent to those skilled in the art in light of this disclosure. Such equivalent designs are fully contemplated by this disclosure.

FIG. 1 illustrates a block diagram of a wireless beacon 100, according to one embodiment. The wireless beacon 100 includes a processor 102, memory 104, a receiver 106, a transmitter 108, a power supply 110, a tag reader 111, and one or more sensors 112 that collectively function to transmit wireless location signals for use in identifying a particular part's location. The illustrated components of wireless beacons 100 may be encapsulated in a casing made of plastic, rubber, metal, or other type of material that protects the electronic components of the wireless beacon 100 from damage inside the manufacturing facility. Although the various blocks of FIG. 1 are shown with lines for the sake of clarity, in reality, delineating various components is not so clear, and metaphorically, the lines would more accurately be blurry. For example, processor 102 may have internal memory. The inventor hereof recognizes that such is the nature of the art and reiterates that the diagram of FIG. 1 is merely illustrative of an exemplary wireless beacon that can be used in connection with one or more of the disclosed embodiments. Moreover, alternative embodiments may include additional components or may not include some of the illustrated components, and equivalents of the various components will be readily apparent to those of skill in the art.

Processor 102 may include one or more microprocessors, microcontrollers, arithmetic logic units (ALUs), integrated circuits (ICs), application-specific ICs (ASICs) or chips, systems on chip (SoC), or other processing units configured to instruct transmission of wireless location signals according to the techniques and methods disclosed herein. In one embodiment, processor 102 include a Bluetooth-branded chip or circuit (e.g., a Bluetooth low energy (LE) or other Bluetooth Smart version chip) capable of selectively broadcasting low-energy wireless signals based on data detected by various sensors 112.

The wireless beacon 100 transmits location signals to receiver devices using the transmitter 108. In one embodiment, the transmitter 108 includes a Bluetooth-branded transmitter capable of transmitting controlled-range wireless transmissions. Such a transmitter may specifically use a Bluetooth LE (e.g., Bluetooth version 4.x) or a Bluetooth Smart transmitter capable of transmitting wireless signals at further piconet distances and at lower peak, average, and idle mode power consumption than legacy Bluetooth transmitters. Other embodiments may use legacy Bluetooth transmitters (e.g., Bluetooth versions 1.x, 2.x, 3.x, etc.).

When using Bluetooth for wireless transmissions to the receiver devices, transmitter 108 may use a Bluetooth antenna to transmit location signals, or other messages, on a radio channel that regularly changes frequency (i.e., hops) according to a predetermined code. For example, transmitter 108 may include a Bluetooth transmitter that transmits in the unlicensed industrial, scientific, and medical (ISM) band at or about at 2.4 to 2.485 GHz, using a spread-spectrum frequency-hopping full-duplex signal at a nominal rate at or about 1600 hops/sec. Frequency hopping may occur across about 79 frequencies at or about at 1 MHz intervals, in some embodiments. Other embodiments may use various other adaptive frequency hopping (AFH) techniques.

Receiver devices, which are disclosed in more detail in the Concurrently Filed Applications, may be configured to receive signals along the same frequencies as those used by the transmitter 108. For example, a receiver device may tune to the same transmission frequencies and hopping schemes being used by the transmitter 108, enabling the receiver device to listen to the appropriate frequency at the appropriate time to receive data packets of location signals.

In other embodiments, the transmitter 108 comprises a Zigbee-branded transmitter to wirelessly transmit location signals to receiver devices. In such embodiments, the transmitter 108 operates on the physical radio specification of the Institute of Electrical and Electronics Engineers (IEEE) 802.15.4 standard and transmits in the unlicensed bands at or about at 2.4 GHz, 900 MHz, and 868 MHz. In other embodiments, the transmitter 108 wirelessly transmits location signals according to the IEEE 802.11 Wi-Fi standard. In such embodiments, the transmitter 108 operates on or about on the 2.4 GHz or 5 GHz ISM radio frequency bands. The transmitter 108 may alternatively be configured to transmit location signals using various other wireless protocols, e.g., without limitation, WirelessHD, WiGig, Z-Wave, and the like. Receiver devices may be tuned accordingly to listen for data packets along corresponding frequency bands used by the aforesaid communications protocols.

Additionally or alternatively, transmitter 108 may take the form of active or semi-passive radio frequency identification (RFID) transmitters, in some embodiments. Using active or semi-active RFID transmitters, transmitter 108 may wirelessly broadcast at a variety of frequencies, e.g., without limitation, at low frequency bands of or about 125/135 kHz, relatively high frequency bands (when compared to the low frequency band) of or about 13.56 MHz, and relatively ultra-high frequency bands (when compared to the low and high frequency bands) of or about 850-950 MHz. Receiver devices may be tuned accordingly to listen for data packets along corresponding frequency bands used by the aforesaid communications protocols.

The receiver 106 is capable of receiving data, either wirelessly through any of the aforementioned wireless communication protocols or through a wired connection. In one embodiment, the receiver 106 receives a part identifier (ID) 116 for the part coupled to the wireless beacon 100, allowing the wireless beacon 100 to locally store the part identifier 116 in memory 104. Locally storing the part identifier (ID) 116 in memory 104 allows the wireless beacon to include the part identifier in location signals that are wirelessly transmitted to receiver devices without having to interact with other devices. Not all embodiments will communicate part identifiers 116 in location signals, however. Some embodiments will instead broadcast location signals that include a standard data value or code word, an identifier of the wireless beacon (beacon ID 114) stored in memory 104, or a combination thereof—either with or without the part identifier 116.

In one embodiment, wireless beacon 100 is programmed with the part ID 116 at a programming work station in the facility. Parts may be paired with wireless beacons using programming devices that communicate the part IDs 116 to the wireless beacons 100 for storage thereon. When the part leaves the facility, the wireless beacon 100 may be removed from the part and returned to a storage container until the wireless beacon is paired again with another part by being programmed with that part's part ID 116. In this sense, the wireless beacons 100 are reusable and can be repeatedly used to track different parts coming through the facility.

Wireless beacon 100 includes a variety of computer-readable media, which are represented in FIG. 1 as memory 104. Computer-readable media include computer-storage media and communication media. By way of example, and not limitation, computer-storage media may comprise computer-storage memory that includes, for example but without limitation, Random Access Memory (RAM); Read Only Memory (ROM); Electronically Erasable Programmable Read Only Memory (EEPROM); flash memory or other memory technologies; solid-state memory; and other storage devices; or any other media that can be used to encode desired information and be accessed by wireless beacon 100.

Computer-storage memory may include volatile, nonvolatile, removable, and non-removable media implemented in any method or technology for storage of information including, without limitation, computer-readable instructions, data structures, program modules, data types, dynamic link libraries (DLLs), application programming interfaces (APIs), or other data. Computer-storage memory are tangible, mutually exclusive to communication media, and exclude carrier waves and propagated signals. For purposes of this disclosure, computer-storage media and computer-storage memory are not signals per se. In contrast, communication media typically embody computer readable instructions, data structures, program modules, or other data in a modulated data signal such as a carrier wave or other transport mechanism and include any information delivery media.

Computer-storage memory 104 represents computer-storage media on the wireless beacon 100. In operation, the processor 102 reads data and/or executes computer-executable instructions stored in memory 112. Memory 104 may also store a beacon identifier (ID) 114 indicative of the wireless beacon 100 and a part ID 116 indicative of the part to which the wireless beacon 100 is attached, affixed, paired, or coupled. The beacon ID 114 is a unique alphanumeric value, e.g., a codeword, beacon number, a media access control (MAC) address, or other type of identifier of the wireless beacon 100. The part ID 116 is also a unique alphanumeric value that may include a part number, purchase order (PO) number, customer identifier, shipping number, part description, or other type of identification of the coupled part.

The beacon ID 114 or part ID 116 may be associated on a monitoring server with the coupled part, e.g., MAC address MM:MM:MM:SS:SS:SS stored on the wireless beacon 100 as the beacon ID 114 may be associated on the monitoring server with valve body 00110011. In one embodiment, a mobile device may retrieve the beacon ID 114 or part ID 116 from the wireless beacon 100 and communicate the retrieved beacon ID 114 or part ID 116 to the monitoring server, which can then respond, in turn, with work orders specific to the part associated with those IDs.

Memory 104 stores a signal component 118 that comprises executable instructions dictating when to transmit location signals from the wireless beacons 100 using the transmitter 108. In one embodiment, signal component 118 selectively instructs the processor 102 to transmit location signals upon detected incidents or events, as sensed by one or more hardware or software sensors 112 on the wireless beacon 100. In another embodiment, signal component 118 instructs the processor 102 to periodically transmit location signals at specific time periods (e.g., 25 milliseconds, 30 seconds, 5 minutes, 1 hours, etc); at certain times of the day (8:00 am, noon, 2:00 pm, etc.); on particular days (e.g., Monday, Thursday, etc.); or a combination thereof. In still another embodiment, the wireless beacon 100 may be equipped with a user-interface (e.g., physical button, keypad, etc., joystick, etc.) that allows a user to prompt the transmission of location signals. For instance, a detected specific user interaction (e.g., pushing of a button) by the signal component 118 prompts transmission of location signals. The signal component 118 may be configured to transmit location signals based on input from any of the illustrated sensors 112 or from a combination of signals from the sensors 112. Along these lines, some embodiments may only include one or some combination of the illustrated sensors 112.

Sensors may include an accelerometer 120, a magnetometer 122, a pressure sensor 124, a photometer 126, a thermometer 128, a global positioning sensor (GPS) sensor 130, a gyroscope 132, a rotational vector sensor 132, additional sensors, or a combination thereof. Predicating location-signal transmissions on the sensed inputs can drastically reduce overall power consumption because the wireless beacons 100 only transmit signals—and thus wake up—at particular detected events. In such embodiments, an operating system of the wireless beacon is kept inactive (i.e., sleeps) until a sensor detects a particular threshold event (e.g., movement, acceleration, temperature, light, pressure, rotation, GPS, etc.), at which time the operating system is woken up and location signals are transmitted. Put another way, the wireless beacon 100 is kept inactive until sensors 112 detect particular events specified to trigger the transmission of location signals. This saves considerable battery power in the wireless beacons 100. Wireless beacons 100 can mostly stay in a disabled state until being woken up by a sensor 112 sensing a particular threshold, event, or incident requiring transmission of a location signal.

In one embodiment, the signal component 118, when executed by the processor 102, additionally or alternatively adds sensor data to the location signals that are wirelessly broadcast. For example, direction or acceleration information from the accelerometer 120, magnetic field data from the magnetometer 122, pressure readings from the pressure sensor 124, light data from the photometer 126, temperature readings from the thermometer 128, GPS coordinates from the GPS sensor 130, gyroscopic rotation from the gyroscope 132, and rotational vector magnitudes from the rotational vector sensor 134 may be included in the location signals from the wireless beacon 100. The wireless beacon 100 may transmit various sensor data—either collected at the time the wireless beacon 100 is woken up, historically, or periodically—along with the beacon ID 114, part ID 116, or a combination thereof to the receiver devices discussed below.

The power supply 110 may take the form of a battery, which is either rechargeable or not. Some embodiments may include power monitoring circuitry or software that, when executed by the processor 102, determines the power level of the power supply. Indications of such power levels may be wirelessly communicated from the transmitter 108 using any of the aforementioned wireless communication protocols and techniques to either a receiver device, a client computing device, or a server.

To preserve power, embodiments may selectively transmit location signals from the wireless beacon 100 only when certain events are detected by one or more sensors 112. Embodiments may include only one of the illustrate sensors 120-134 or a combination thereof. The processor 102 may be programmed to process data sensed by the various sensors 112 and consequently initiate the broadcasting or transmitting of location signals when particular conditions are sensed. Location signals may be transmitted either synchronously according to an internal clock (e.g., at a time frequency of or about 60 Hz) or asynchronously.

The tag reader 111 is configured to capture signals from location tags coupled to other parts in the manufacturing facility. In one embodiment, the tag reader 111 is an NFC reader capable of electromagnetically energizing static (or passive) NFC location tags affixed to other parts in the manufacturing facility into communicating information stored on the NFC tags. In another embodiment, the tag reader 111 is an NFC reader capable of communicating with active NFC location tags. In another embodiment, the tag reader 111 is configured to capture and store RFID signals from other types of RFID location tags.

In operation, the signal component 118 instructs the transmitter 108 of the wireless beacon 100 to wirelessly broadcast location signals using low-energy transmissions (e.g., Bluetooth LE) to receiver devices in the manufacturing facility upon detection of various events by the sensors. The tag reader 111 reads tag information from NFC (in one embodiment) or RFID (in another embodiment) location tags coupled to other parts in the manufacturing facility when those parts are brought within a certain NFC or RFID communicative distance to the tag reader 111. The tag information may include a tag ID, MAC address, part ID, or other data unique to the location tag or its coupled part. The tag information captured by the tag reader 111 may be included in the location signals that are wirelessly broadcast by the transmitter 108 to the receiver devices in the manufacturing facility.

Figure 2:
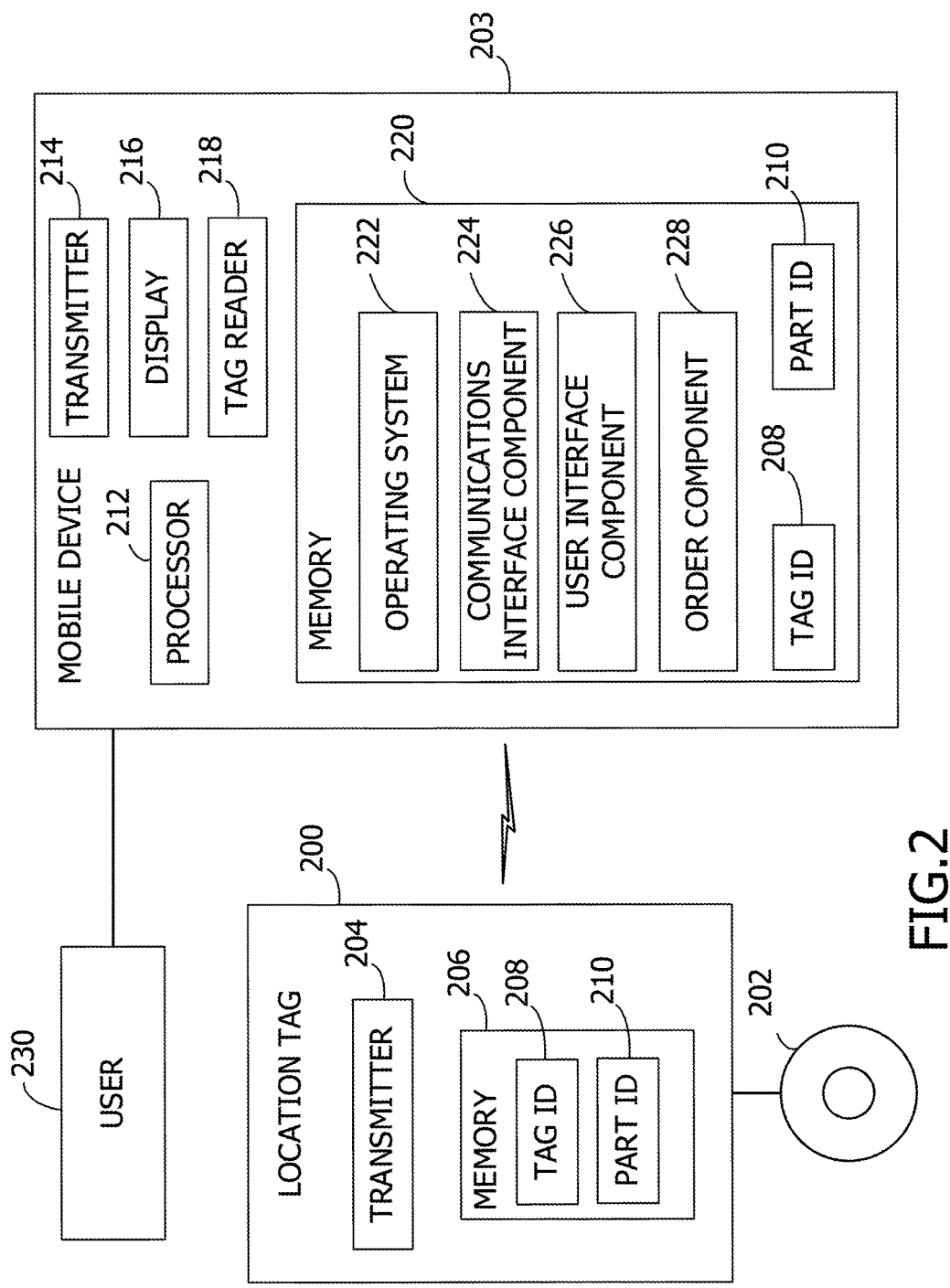
FIG. 2 is a block diagram of a location tag communicating with a mobile device in accordance with some of the disclosed embodiments.

FIG. 2 is a block diagram of a location tag 200 communicating with a mobile device 203 for implementing some of the disclosed embodiments. The location tag 200 is coupled to a part 202 in the manufacturing facility using adhesive, ties, strings, metallic or rubber hands, magnets, or other coupling techniques and includes a transmitter 204 and memory 206 that stores a tag ID 208 and a part ID 210. The tag ID 208 is a unique identifier (e.g., a MAC address) that is specifically assigned to the location tag 200, and the part ID 210 is a programmable identifier that identifies the part 202. The part ID 210 may be programmed into the location tag 200 by workers in the manufacturing facility using a computing device. Alternatively, the location tag 200 may only include a tag ID 208 that workers can associate with the parts 202 on a server, alleviating the need for the part ID 210 to be programmed on the location 200. For example, a worker may access a program that allows the user to pair the tag ID 208 with the part 202 on the monitoring server disclosed herein.

In one embodiment, the location tag 200 is a static NFC tag that does not include a battery source and that uses RF transmissions from the mobile device 203 to power the transmitter 204 enough to wirelessly communicate the tag ID 208 and/or the part ID 210 across an NFC distance (e.g., within six inches or 153 mm). In an alternative embodiment, the location tag is an active NFC tag that also includes a battery source (not shown) for powering the transmitter to wirelessly communicate the tag ID 208 and/or the part ID 210 across the NFC distance to the mobile device 202. In another embodiment, the location tag 200 is a passive RFID tag that uses a transmitted signal from the mobile device 203 to power on the transmitter 204 and wirelessly communicate the tag ID 208 and/or the part ID 210 to the mobile device 202. In still another embodiment, the location tag 200 is an active RFID tag that includes a power supply for charging the transmitter 204 to transmit the tag ID 208 and the part ID 210, either periodically (e.g., every 10 seconds, 1 minute, 5 minutes), upon detection of events through various movement, acceleration, lighting, temperature, rotational sensors (not shown); or upon request from the mobile device 202.

The mobile device 203 represents any device executing instructions (e.g., as application programs, operating system functionality, or both) to implement the functionality associated with the mobile device 203 disclosed herein. The mobile device 203 may include a mobile phone, mobile tablet, handheld device, laptop, personal computer, or other computing device capable of retrieving information from NFC or RFID tags. In particular, the mobile device 203 includes a processor 212, a transmitter 214, a display 216, a tag reader 218, and memory 220. Memory 220 stores executable instructions for an operating system 222, a communications interface component 224, a user interface component 226, and an order component 228. Additionally, memory 220 stores tag IDs 208 and part IDs 210 captured from the location tags 200 in the manufacturing facility through NFC or RFID transmissions.

The operating system 222 controls the executable environment of the mobile device 202. The communications interface component 224 includes a network interface card and/or computer-executable instructions (e.g., a driver) for operating a network interface card that provides access over a public or private network (e.g., the Internet). Communication between the mobile device 203 and other network-connected devices (e.g., the monitoring server, database cluster, and client computing devices discussed below) over a public or private network may occur using any protocol or mechanism over a wired or wireless connection.

The user interface component 226 includes a graphics card and a corresponding graphics-card driver for displaying data to and receiving data from a user 230. The user interface component 226 controls the presentation of UIs on the display 216. The display 216 may include a touch-screen display, a computer screen, a mobile phone screen, a virtual interface, natural user interface, or other presentation device for presenting the UIs disclosed herein. The user interface component 226 may also include one or more of the following to provide data to the user 230 or receive data from the user: speakers, a sound card, a camera, a microphone, a vibration motor, a keyboard, a mouse, a Bluetooth-compatible communication module, and gesture-recognition software.

In operation, when the mobile device 203 is brought within a communicable distance to the location tag 200 (e.g., within six inches or 153 mm for NFC tags), the tag reader 218 retrieves the tag ID 208 and part ID 210 from the location tag 200 and stores the retrieved IDs in memory 220 of the mobile device 203. When the location tag 200 is a static (i.e., passive) NFC tag, the tag reader 218 or the transmitter 214 of the mobile device 203 emit RF signals that power the transmitter 214 enough to wirelessly broadcast the tag ID 208 and the part ID 210 across the communicable distance to the mobile device 203. When the location tag 200 is an active NFC or RFID tag, the tag reader 218 triggers the mobile device 203 to broadcast a signal that turns on a power source (not shown) of the location tag 200 in order to wirelessly broadcast the tag ID 208 and the part ID 210 to the mobile device 203.

The order component 228 directs the transmitter 214 to communicate the tag ID 208 and the part ID 210 over a network to a monitoring server in requests for work orders related to the part 202. Independent of the interaction with the location tag 200, the monitoring server constantly monitors the real-time location of the part 202 using location signals transmitted to one or more receiver devices in the facility, and identifiers which work area or sub-work area the part 202 is currently located. The monitoring server updates work orders for the part 202 based on the historical and real-time locations of the part 202 and provides the work orders to the mobile device 203 in response to the work-order requests from the mobile device 203. The order component 228 presents received work orders for the part 202 on the display 216 to the user 230. Thus, the mobile device 203 requests work orders for the part 202 using the tag ID 208 and/or the part ID 210, and provides the user 230 with up-to-date work orders received from the monitoring server.

FIG. 3A is an exploded-view diagram of a valve 300 with a wireless beacon 100 coupled to one of the valve's constituent parts, according to one embodiment. Valve 300 comprises a valve body 302, a hand wheel 304, an actuator 306, a shaft 308, and a valve disc 310. The valve body 302, hand wheel 304, actuator 306, shaft 308, and valve disc 310 are machined, welded, and assembled in a manufacturing facility into valve 300. The wireless beacon 100 may be coupled to the valve body 302 in any number of ways. For example, the wireless beacon 100 may be tied to the valve body 202; affixed with an adhesive; attached with bands (e.g., plastic, metallic, rubber, etc.), ties, ropes, strings, clasps, hooks, Velcro, magnets, clips, fasteners; placed in a container, bag, pocket, bin, or other receptacle that travels with the valve body 302 throughout the manufacturing facility; or otherwise coupled to the valve body 302.

Location tags 200 are coupled to other constituent parts, i.e., the hand wheel 304, the shaft cover 306, the shaft 308, and the valve disc 310. In embodiment, the wireless beacon 100 receives tag IDs 208 and part IDs 210, via NFC transmission, from the location tags 200 when the location tags are moved within an NFC communicable distance to the wireless beacon 100. In other words, when the location tags 300 are brought into close proximity to the wireless beacon 100, the wireless beacon 100 retrieves the tag ID 208 and/or part ID 210. For instance, when valve disc 310 is inserted into the center of the valve body 302, the location tag 200 affixed to the valve disc 310 transmits its tag ID 208 or part ID 210 to the wireless beacon 100. In one embodiment, the wireless beacon 100 wirelessly communicates, via Bluetooth LE or some other low-energy wireless transmission, location signals that include the tag IDs 208 and part IDs 210 to receiver devices in the manufacturing facility.

Figure 3B:
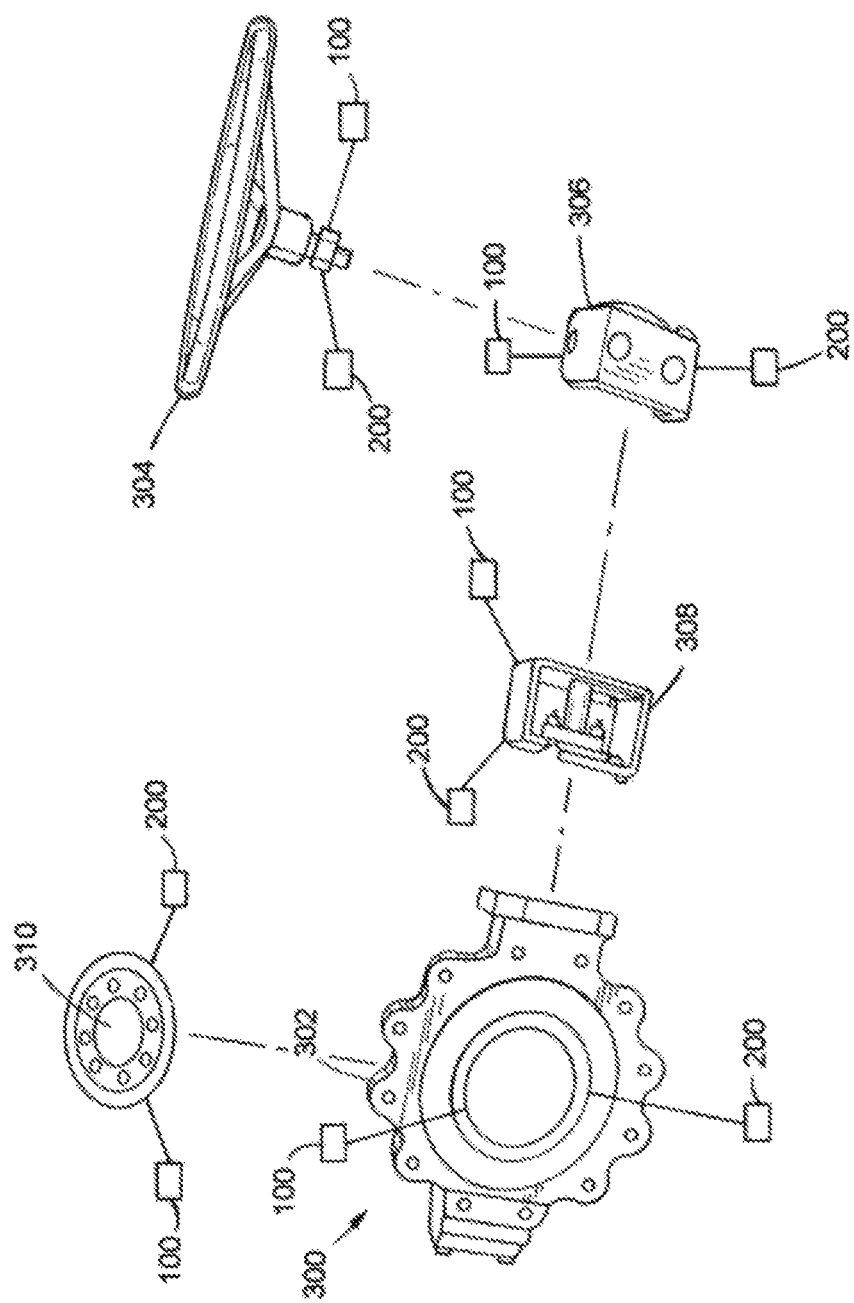
FIG. 3B is an exploded-view diagram of a part with wireless beacons and location tags in accordance with some of the disclosed embodiments.

In FIG. 3A, only the valve body 302 is shown as having a coupled wireless beacon 100, and is not shown to include a location tag 200. Wireless beacons 100 and location tags 200 may be attached to any constituent parts in the manufacturing facility. FIG. 3B shows the valve 300 with each constituent part—i.e., the the valve body 302, the hand wheel 304, the actuator 306, the shaft 308, and the valve disc 310—being each affixed with wireless beacons 100 and location tags 200. Wireless beacons 100 and location tags 200 may be coupled to any constituent parts in the manufacturing facility.

Figure 4:
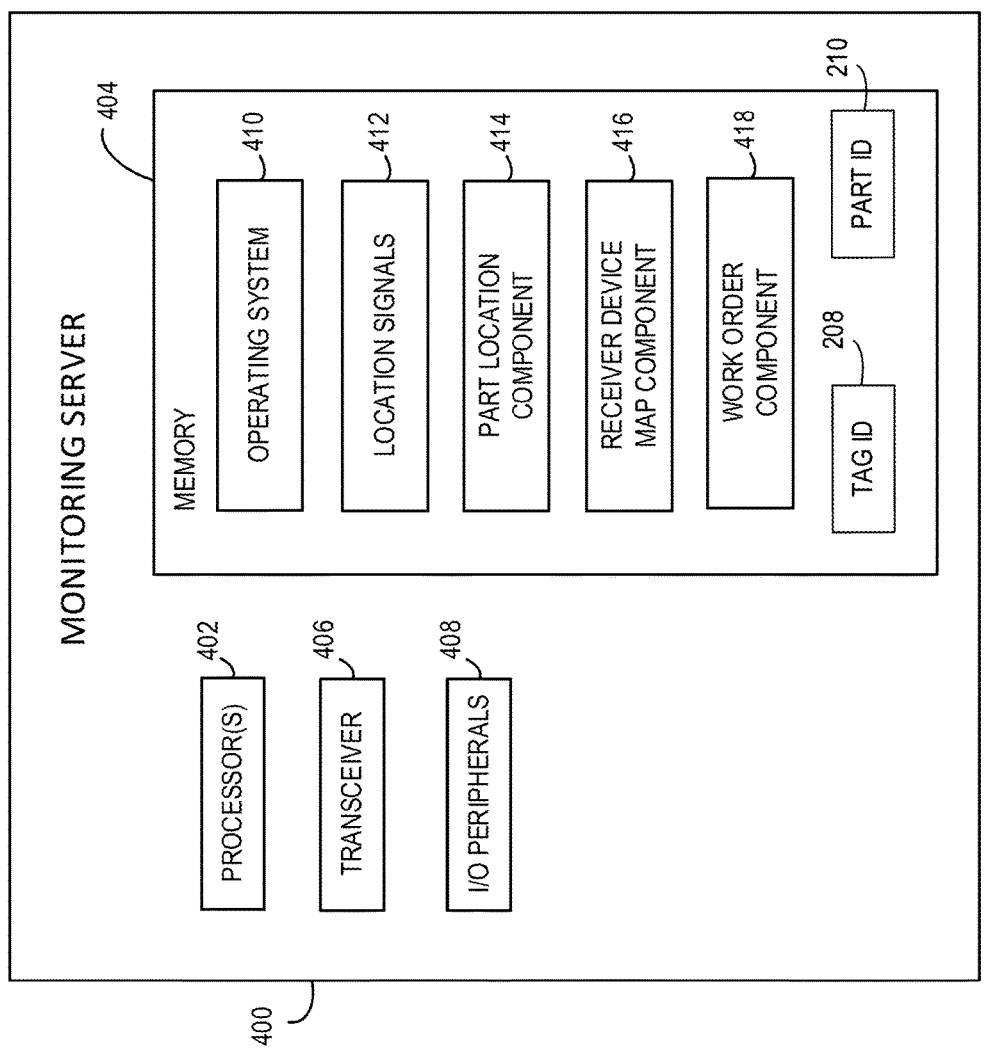
FIG. 4 is a block diagram of a monitoring server in accordance with some of the disclosed embodiments.

FIG. 4 is a block diagram of a monitoring server 400 in accordance with some of the disclosed embodiments. Monitoring server 400 includes one or more processors 402, a transceiver 406, I/O peripheral devices 408, and memory 404. Memory 404 stores an operating system 410, location signals generated by wireless beacons 100, a part location component 414, a receiver device map component 416, a work order component 418, and tag IDs 208 and part IDs 210 of received location tags. While the illustrated monitoring server 400 appears to be a single physical device, the shown embodiment may actually operate across a plurality of physical devices—e.g., multiple servers in a relational server configuration.

The processors 402 include one or more microprocessors, microcontrollers, graphic processing units (GPUs), ASICs, ICs, ALUs, or the like. The monitoring server 400 may be connected to various presentation devices represented as I/O peripherals 408 that include, for example but without limitation: a display device (e.g., computer monitor, projector, touch screen display, television, glasses, virtual surface, etc.), speaker, printer, vibrating component, microphone, speaker, a microphone, a joystick, a satellite dish, a scanner, a remote control, a graphical user interface (GUI), wearable (e.g., watches, glasses, headsets, or earphones), or the like. In one particular embodiment, the I/O peripherals 408 include connectivity to a video projector or display monitor configured to present the spatial or virtual board UIs described in the Concurrently Filed Applications that show real-time locations of parts in the manufacturing facility.

In one embodiment, as disclosed in the Concurrently Filed Applications, location signals 412 are wirelessly communicated from the wireless beacons 100 coupled to parts to receiver devices in the manufacturing facility, and the receiver devices transmit the location signals—either with our without identifiers specific to the receiver devices themselves—over a network to the monitoring server 400. The location signals may include tag IDs 208 and part IDs 210 retrieved from location tags 200 by the wireless beacons 100. Additionally or alternatively, the tag IDs 208 and part IDs 210 may be communicated to the monitoring server 400 over a network (e.g., the Internet) from a mobile device.

In one embodiment, the part location component 414 determines the real-time locations of the parts in the manufacturing facility using the received location signals 412 from the receiver devices. One embodiment determines part locations using the strength of the location signals captured by the various receiver devices in the manufacturing facility. For example, if three receiver devices receive a wireless location signals from a wireless beacon 100 at a specific time, the monitoring service 400 identifies which of the receiver devices captured the strongest signal and assigns the part coupled to the wireless beacon 100 to the work or sub-work area where the strongest-signal receiver device is located. Additionally or alternatively, the monitoring server 400 may determine part locations using detected sensor data (e.g., movement, acceleration, direction, pressure, magnetic field, light, temperature, rotation, etc.) captured by the wireless beacon 100 and included in the location signals 412.

The location signals 412 received and stored on the monitoring server 400 may include data transmitted from either the wireless beacons 100 and/or the receiver devices, e.g., part ID, beacon ID, time, date, MAC address, codeword, signal strength, receiver device ID, etc. Additionally or alternatively, the location signals may include the tag IDs 206 and the part IDs 210 of the location tags 200 captured by the wireless beacons 100 through NFC or RFID transmissions. For example, tag IDs 208 and part IDs 210 may be captured by the wireless beacons 100 when location tags 200 are brought into communicable proximity (e.g., within an NFC distance of six inches or 153 mm) to the wireless beacons 100, and the signal component 118 of the wireless beacons 100 may add the captured tag IDs 208 and part IDs 210 to location signals transmitted to the receiver devices, which in turn transmit the location signals with the captured tag IDs 208 and part IDs 210 to the monitoring server 400 for storage in memory 404.

Parts may be located in the manufacturing facility using a map of the various work and sub-work areas of the manufacturing facility. Such a map, in one embodiment, is generated by the receiver device map component 416, which identifies different work and sub-work area locations in the manufacturing facility based on the strategic placement or user assignment of the receiver devices. Receiver devices may be placed within a certain proximity to the different work and sub-work areas, and each receiver device can be assigned a particular work or sub-work area. For example, one receiver device may be assigned to the holding sub-work area of a welding work area, another receiver device may be assigned to a machining area's completed sub-work area, and another receiver device may be assigned to a shipping work area. Thus, users may define the various work and sub-work areas of the manufacturing facility through strategic placement of the receiver devices.

The map maintained by the receiver device map component 416 may include an x/y coordinate mapping of the manufacturing facility with various portions assigned to different work and sub-work areas. Receiver devices may be assigned to the different portions of the x/y coordinate mapping and work/sub-work areas. In one embodiment, receiver devices are mapped to the x/y coordinates in a one-to-one manner, meaning that each coordinate may be assigned to just one receiver device. Alternative embodiments map x/y coordinates of the map on a one-to-many basis such that coordinates are assigned to more than one receiver device. Each receiver device can then be assigned to a specific work area or sub-work area.

The monitoring server 400 also receives requests for work orders from the mobile devices 203 that communicate with the location tags 200. For example, a worker may touch a mobile device 203 to a location tag 202 coupled to a part, causing the mobile device 203 to retrieve either the tag ID 208 or the part ID 210 of the location tag 200 through an NFC communication, and the mobile device 203 may request work orders for the part coupled to the location tag 202—as identified by the tag ID 208 or the part ID 210—to the monitoring server 400. In one embodiment, the work order component 418 maintains a database of tag IDs 208 to parts and corresponding work orders, and responds to requests from the mobile devices 203 by providing the most up-to-date work order for a given part. For example, the work order component 418 may associate part ID 01010101 with a valve body in the manufacturing facility and maintain a work order identifying manufacturing stages (e.g., welding, machining, assembly, etc.) and job tasks (e.g., weld a hand wheel to the valve body, machine a groove for a valve disc, and insert a shaft and shaft cover with the welded valve body and hand wheel) for the part ID 01010101 valve body. The work order component 418 responds to the work order requests from the mobile devices 203 with the most current work order for a given part.

The work order component 418 may update and modify work orders of parts based on input from users sent via the mobile devices 202. User input may include, for example but without limitation, testing information, part dimensions, times of job task completions, requested constituent parts for assembly or welding, quality control metrics, or any other information specific to the manufacturing or servicing of parts. Examples of work orders are presented in the UI diagrams of accompanying FIGS. 12 and 13 of this disclosure. Though, embodiments are not limited to the depicted or aforesaid information. Equivalents thereof or alternative information may also be captured from workers on the mobile devices 202, stored on the monitoring server 400, and included in work orders.

Figure 5:
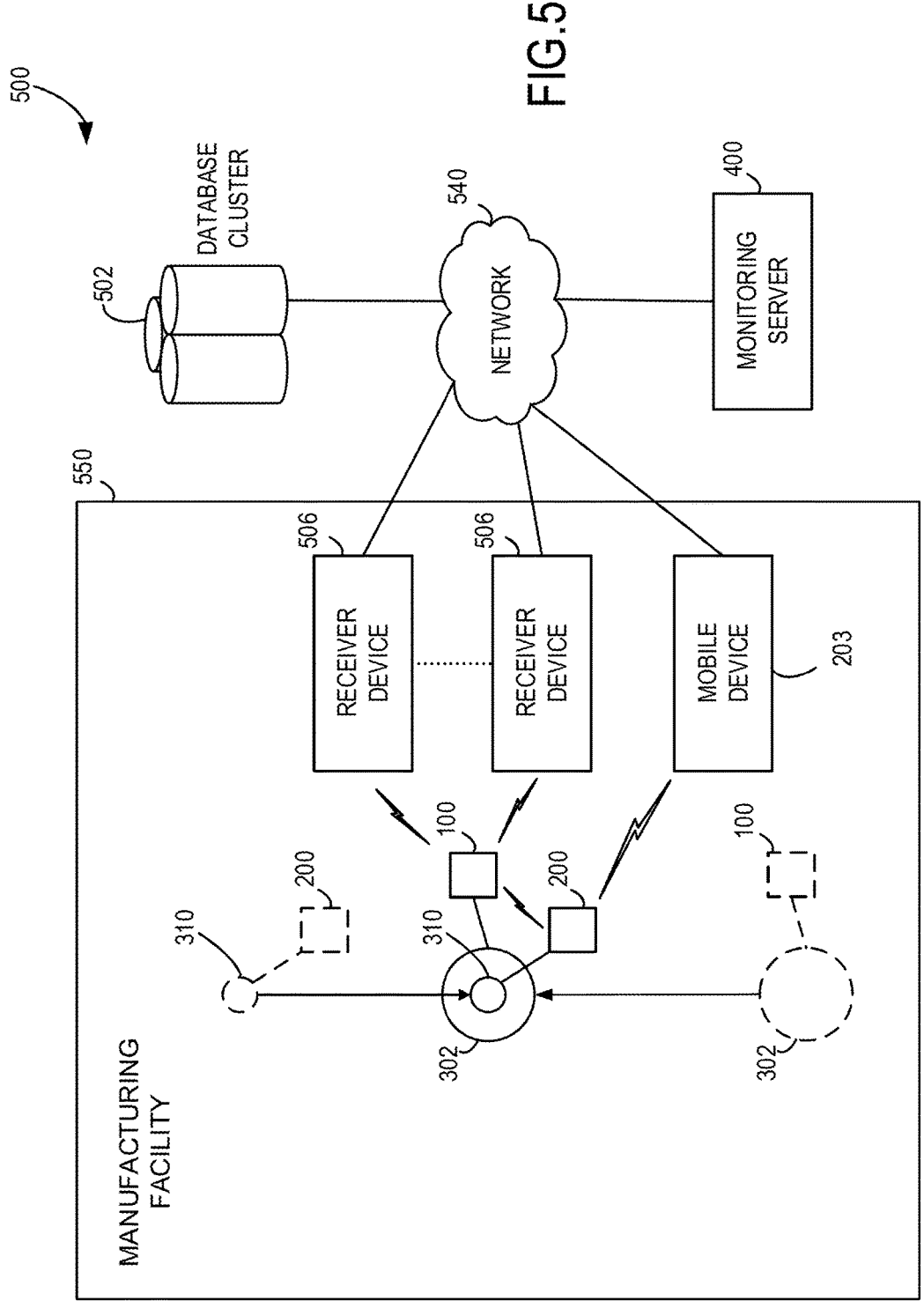
FIG. 5 is a block diagram of a networking environment in accordance with some of the disclosed embodiments.

FIG. 5 is a block diagram of a networking environment 500 for implementing some of the disclosed embodiments. Receiver devices 506 and mobile devices 203 located in a manufacturing facility 550 communicate over a network 540 to a monitoring server 400. A database cluster 502 of servers are accessible over the network 540 by the monitoring server 400—or any of the other illustrated devices—for storing location signals, work orders, job tasks, employee information, or other specifics being tracked throughout the manufacturing or servicing of parts.

The network 540 may be a public or private computer network. Examples of such networks include, for example but without limitation, a local area network (LAN), a wide area network (WAN), or the like. When network 540 comprises a LAN networking environment, components may be connected to the LAN through a network interface or adaptor. When network 540 comprises a WAN networking environment, components may use a modem to establish communications over the WAN. The network 540 is not limited, however, to connections coupling separate computer units. Instead, the network 540 may also include subsystems that transfer data between computing devices. For example, the network 540 may include a point-to-point connection.

FIG. 5 depicts two constituent parts, a valve body 302 and a valve disc 310, that are initially separated in the manufacturing facility 550 (as shown by dotted outline) and then assembled together (as shown by solid outline) in the manufacturing facility 550. As one example of the disclosed embodiments, the valve body 302 is coupled with a wireless beacon 100 that transmits wireless location signals, either periodically or upon detection of various sensed events. These location signals include a beacon ID 114 (e.g., MAC address of the wireless beacon) or a part ID 116 (e.g., part number) of the valve body 202 coupled to the wireless beacon 100.

Moreover, the valve disc 310 is coupled with a location tag 200. The tag reader 118 of the wireless beacon 100 is capable of reading a tag ID 208 and/or a part ID 210 of the location tag 200 when the wireless beacon 100 and location tag 200 are moved within an NFC (in one embodiment) or other type of RFID (in other embodiments) communicable distance to each other. For example, workers may touch the wireless beacon 100 to the location tag 200 to retrieve the tag ID 208 and/or the part ID 210 from the location tag 200. In one embodiment, the retrieved tag ID 208 and part ID 210 (or just one of the identifiers) are added to location signals of the wireless beacon 100, which already include the beacon ID 114 of the wireless beacon 100 and/or part ID 116 of valve body 302. In one embodiment, such location signals are wirelessly broadcast by the wireless beacon 100 using low energy transmissions (e.g., Bluetooth LE or Bluetooth Smart) to the receiver devices 506. In turn, the receiver devices 506 communicate the location signals of the wireless beacon 100 across the network 540 to the monitoring server 400. And the monitoring server 400 determines the real-time locations of the valve body 302 and the valve disc 310 by analyzing the location signals captured at different receiver devices 506 to determine the receiver device(s) 506 closest to the assembled constituent parts—e.g., through triangulation, strength of signal, or a combination thereof. Because the location signals include the beacon ID 114 or part ID 116 associated on the monitoring server with the coupled valve body 302 and the tag ID 208 or part ID 210 associated on the monitoring server 400 with the valve disc 310, the monitoring server 400 can determine the real-time location of both constituent parts using just one set of broadcast location signals from the wireless beacon 100, and need not communicate with the location tag 200. Put another way, wireless beacons 100 coupled to one constituent part can be used to instruct the monitoring server 400 about the locations of other parts having location tags 200.

Additionally or alternatively, the monitoring server 400 may also make operational decisions about the manufacturing or servicing taking place in the manufacturing facility 550 using the location signals transmitted by the wireless beacons 100. If, for example, the wireless beacon 100 transmits location signals from constituent parts not coupled to wireless beacons 100, one may assume that the two constituent parts are close enough in the manufacturing facility 550 to be assembled together, welded together, molded together, or otherwise have undertaken a manufacturing or service job task requiring the parts to be proximately close. So, in some embodiments, the work order component 418 of the monitoring server 400 is configured to interpret receipt of two different part, tag, or beacon IDs as an indication that a particular manufacturing or servicing job task has been completed, and accordingly updates an associated work order for either or both of the parts.

Work orders may be conditional on other work orders, meaning that one may influence another. For example, a first part having been machined and moved to a welding work area may indicate that a second part is ready to be move out of a curing work area and moved to the assembly work area to await the welded first part. In another example, curing of a particular part may be halted because a second constituent part that later must be assembled to the cured part is not in the manufacturing facility 550 or has not finished progressing through other work areas. Work orders for those parts may be updated accordingly. Numerous other examples could be given, but need to be exhaustively listed for the reader to understand that the monitoring server 400 may condition and update the work orders automatically based on determined part locations, assumed job task completions, stocks of parts, or other detected operations in the manufacturing facility 550.

The database cluster 502 represents one or more servers configured to store historical locations, job task completions, work orders and work-order data, and/or location signals associated with the parts in the manufacturing facility 550. Such information may be useful in determining facility production efficiency, employee efficiency, manufacturing or service capacity, shipping times, or other valuable metrics. The servers in the database cluster 502 may include their own processors, computer-storage media, database software, and other necessary components for maintaining records of part traffic in the manufacturing facility 550.

Figure 6:
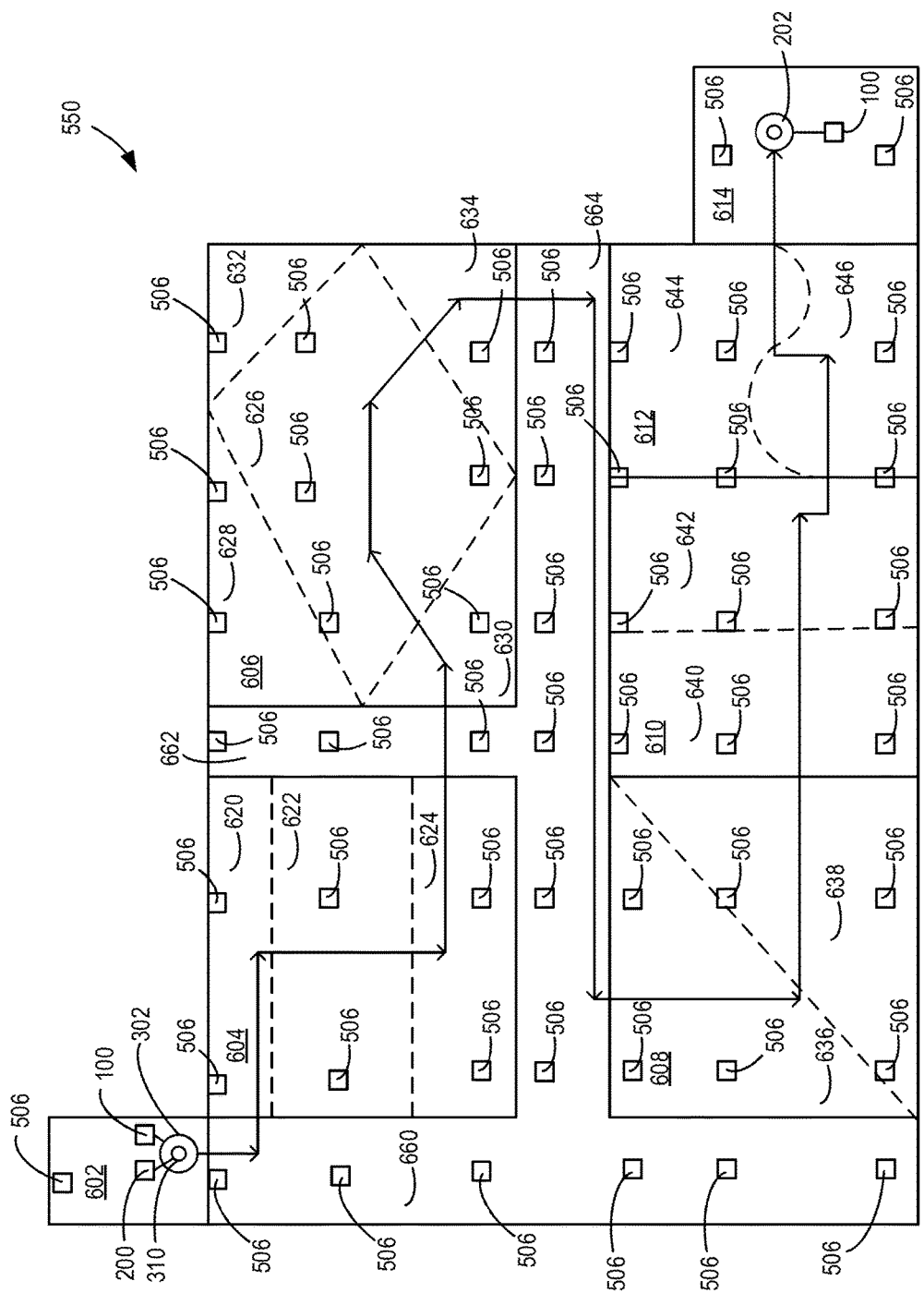
FIG. 6 is diagram of a manufacturing facility with strategically positioned receiver devices in accordance with some of the disclosed embodiments.

FIG. 6 is a map diagram of a manufacturing facility 550 with strategically positioned receiver devices 506 for tracking the real-time locations of parts (represented by valve body 302 and valve disc 310), in accordance with different embodiments. The manufacturing facility 550 includes work areas 602, 604, 606, 608, 610, 612, and 614 that are operationally partitioned into various sub-work areas 620, 622, 624, 626, 628, 630, 632, 634, 636, 638, 640, 642, 644, and 646. Also, walkways 660, 662, and 664 represent traffic areas in the manufacturing facility 600. The delineated lines of the work and sub-work areas may be physically partitioned from one another or just operationally separated. The work and sub-work areas may take any shape in the manufacturing facility, as indicated by the various patterns shown. The wireless beacon 100 transmits wireless signals as the part moves through the manufacturing facility through work from area 602 to 614. Receiver devices 506 capture the wireless signals and transmit such signals over a network to a monitoring server 400, which, as discussed above, identifies the work area or sub-work area in which parts 302 and 310 are currently located.

Figure 7:
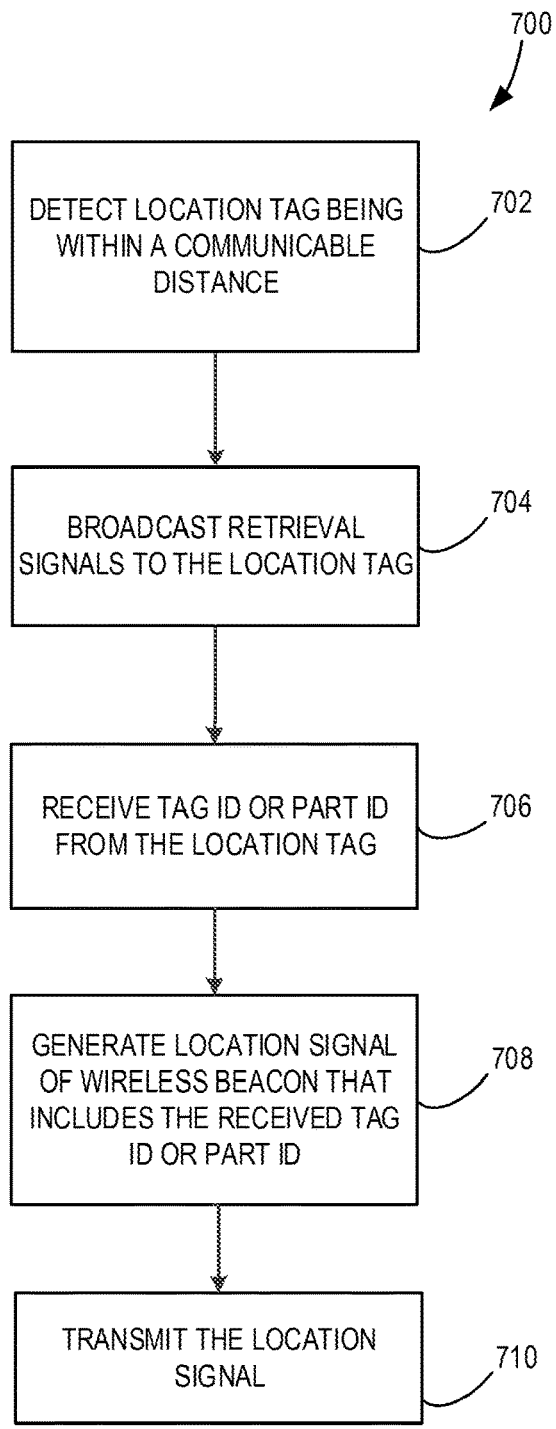
FIG. 7 is a flow chart diagram of a work flow for operating a wireless beacon to aid in identifying parts in a manufacturing facility in accordance with some of the disclosed embodiments.

FIG. 7 is a flow chart diagram of a work flow 700 for operating a wireless beacon to track parts in a manufacturing facility 550 in accordance with some of the disclosed embodiments. The wireless beacon detects location tags in the manufacturing facility that are within a communicable distance to the wireless beacon, as indicated at block 702. For example, a part with a location tag may be moved toward a part with a wireless beacon such that the location tag and the wireless beacon touch each other or are within an NFC communication distance to one another. Once the wireless beacon detects a location tag within a communicable distance, the wireless beacon broadcasts RF retrieval signals to either energize a passive location tag (in some embodiments) or request the transmission of information from an active location tag (in other embodiments), as indicated at block 704. The RF retrieval signals cause the location tag to wirelessly transmit to the wireless beacon a stored tag ID specific to the location tag or a part ID specific to a part coupled to the location tag. The transmitted tag ID and/or part ID is received by the wireless beacon and added to a location signal that the wireless beacon generates, as shown at blocks 706 and 708, respectively. The location signal with the location tag's tag ID or part ID is wirelessly transmitted in the manufacturing facility where receiver devices are strategically placed to capture and relay location signals over a network to monitoring servers that use the location signals to track real-time locations in the manufacturing facility of the parts coupled to the wireless beacon and the location tag.

Figure 8:
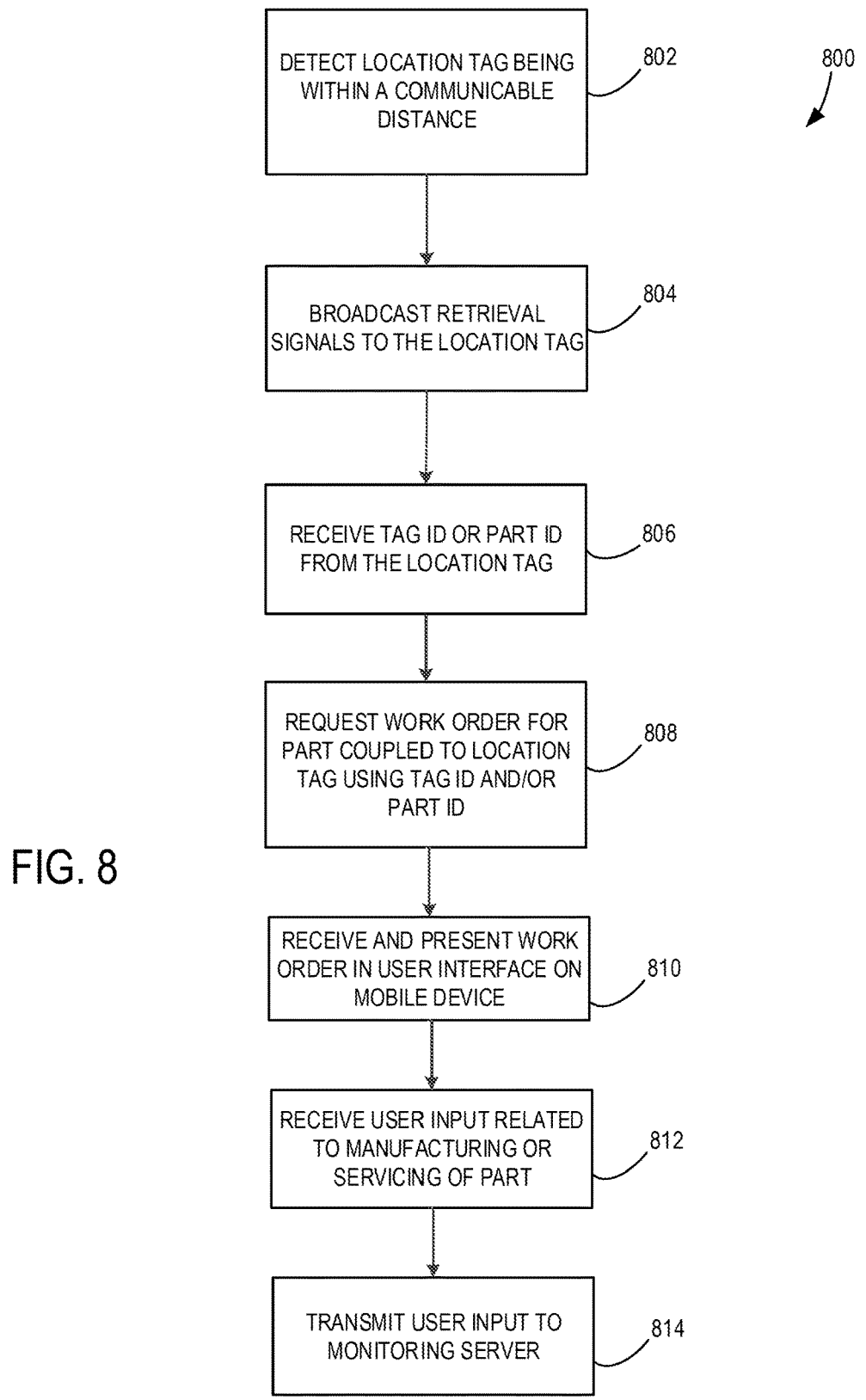
FIG. 8 is a flow chart diagram of a work flow for operating a mobile device to identify parts in a manufacturing facility and display work orders to a user in accordance with some of the disclosed embodiments.

FIG. 8 is a flow chart diagram of a work flow 800 for operating a mobile device to identify parts in a manufacturing facility and display work orders to a user in accordance with some of the disclosed embodiments. A worker may bring the mobile device into a communicable distance so as to detect the location tag, as indicated at block 802. For example, the worker may touch or bring the mobile device within an NFC communication distance to the location tag. Once the mobile device detects a location tag within a communicable distance, the mobile device broadcasts RF retrieval signals to either energize a passive location tag (in some embodiments) or request the transmission of information from an active location tag (in other embodiments), as indicated at block 804. The RF retrieval signals cause the location tag to wirelessly transmit to the mobile device a stored tag ID specific to the location tag or part ID specific to a part coupled to the location tag. The transmitted tag ID and/or part ID is received by the mobile device, as shown at block 806, and used to request work orders for the coupled part from a monitoring server, as shown at block 808. Another embodiment may transmit a location signal that includes the tag ID or part ID from the mobile device over a public or private network to the monitoring server, and the monitoring servers uses the mobile device-transmitted location signal to identify the real-time location of the coupled part in the manufacturing facility.

Work orders from the monitoring server are received and presented on a display of the mobile device, as shown at block 808. The work orders may be presented in interactive UIs that allow the worker to input various details about the manufacturing or servicing of the part. The UIs receive worker input regarding part manufacturing or servicing (e.g., completion of job tasks, requests for constituent parts, worker sign-off, part test results, quality control checks, etc.), as shown at block 812, and the user input is transmitted over the network to the monitoring server, as shown at block 814. The monitoring server may then update the work order for the part or other related parts according to the user input.

Figure 9A:
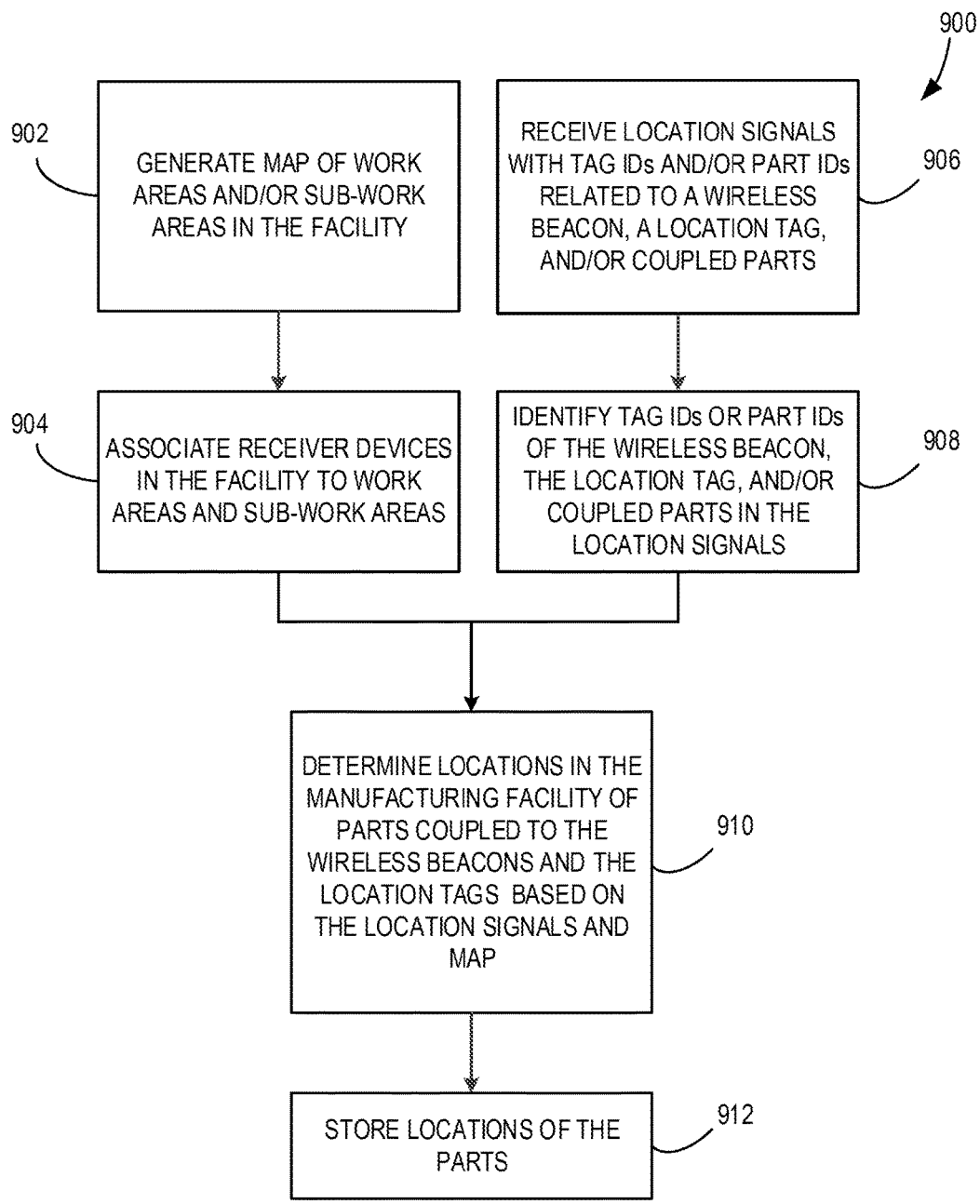
FIG. 9A is a flow chart diagram of a work flow for tracking parts in a manufacturing facility in accordance with some of the disclosed embodiments.

FIG. 9A is a flow chart diagram of a work flow 900 for tracking parts in a manufacturing facility in accordance with some of the disclosed embodiments. A monitoring server generates a map of the work areas and/or sub-work areas in the manufacturing facility, as shown at block 902. The work areas or sub-work areas may be specified by a user. Once the work areas and sub-work areas are specified, receiver devices in the facility are associated with the work areas and sub-work areas based on the receiver devices locations in the facility, as shown at block 904. For example, receiver devices in the welding work area may be associated accordingly.

As shown at block 906, the monitoring server receives location signals of a wireless beacon through the receiver devices in the manufacturing facility. The location signals include beacon IDs specific to the wireless beacon, tag IDs specific to location tags, part IDs specific to parts coupled to the wireless beacons or location tags, or a combination thereof. The location signals from the wireless beacons—which, again, are communicated to the monitoring server through receiver devices—provide indications of both the wireless beacons and the location tags. The monitoring server identifies in the location signals the tag IDs of the location tags or the part IDs coupled to the location tags, as shown at block 908. The monitoring server determines the real-time locations of the parts coupled to the wireless beacon and the location tag using the location signals of the wireless beacons—e.g., through strength of the location signals or triangulation techniques disclosed in the Concurrently Filed Applications. Part locations are stored on the monitoring server, or in a remote database cluster of servers, as indicated at block 912. The real-time locations of the parts coupled to the wireless beacons and the parts coupled to the location tags may be presented to users in various interactive UIs—e.g., the spatial and virtual board UIs disclosed in the Concurrently Filed Applications or on workers' computing devices.

Figure 9B:
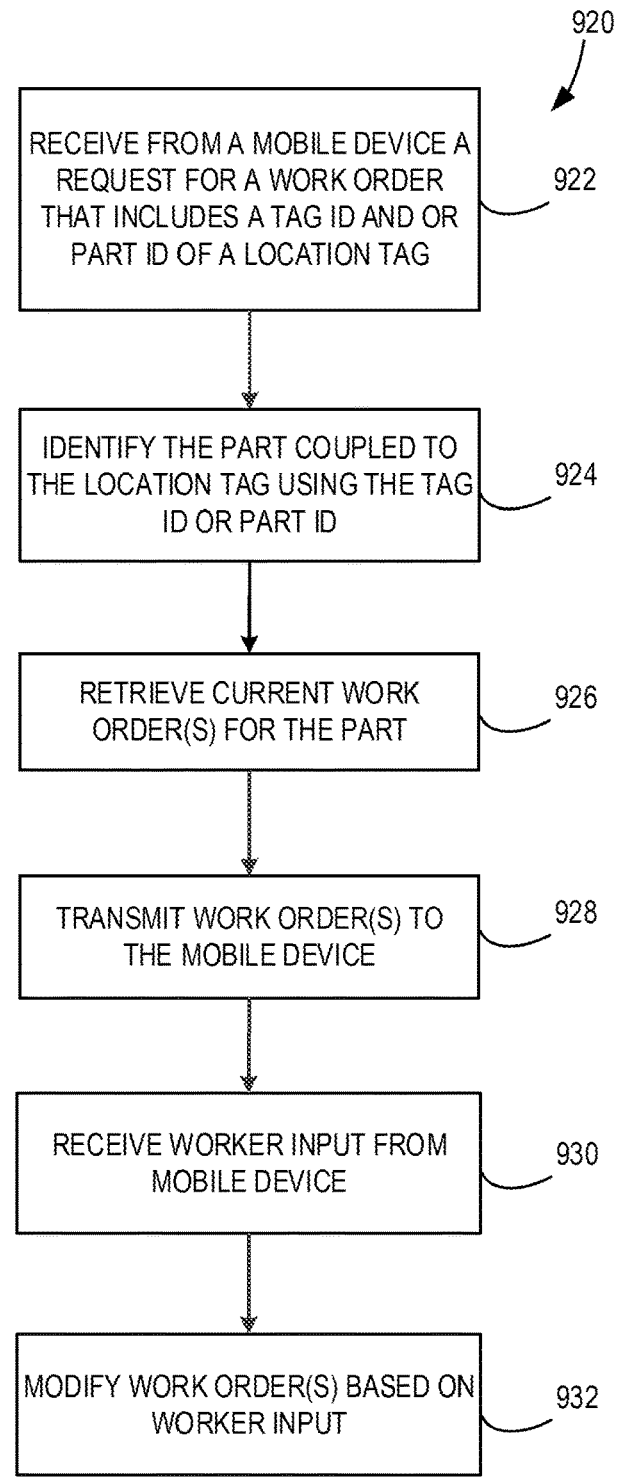
FIG. 9B is a flow chart diagram of a work flow for providing and managing work orders related to tracked parts in a manufacturing facility in accordance with some of the disclosed embodiments.

FIG. 9B is a flow chart diagram of a work flow 920 for providing and managing work orders related to tracked parts in a manufacturing facility in accordance with some of the disclosed embodiments. A worker may touch a mobile device to a location tag coupled to a part in the manufacturing facility, causing the mobile device to retrieve a tag ID or part ID stored on the location tag. An order component on the mobile device transmits the retrieved tag ID or part ID in a work-order request to a monitoring server. As shown at block 922, the monitoring server receives the work-order request transmitted by the mobile device, and identifies the part coupled to the location tag using the tag ID or the part ID, as shown at block 924. The monitoring server retrieves one or more work orders for the part associated with the tag ID or the part ID, as shown at block 926. The retrieved work orders are transmitted back to the mobile, as shown at block 928, and the mobile device displays the retrieved work orders to the worker in a UI.

The worker may interact with the UI, in some embodiments, and input data about the part's manufacturing or servicing (e.g., completion of job tasks, requests for constituent parts, worker sign-off, part test results, quality control checks, etc.). The mobile device communicates the worker's input to the monitoring server. As shown at block 930, the monitoring server receives the worker's input from the mobile device and modifies the work order(s) or work orders for other related parts (e.g., a valve disc needing to be assembled with a valve body) based on the worker's input, as shown at block 932.

Figure 10:
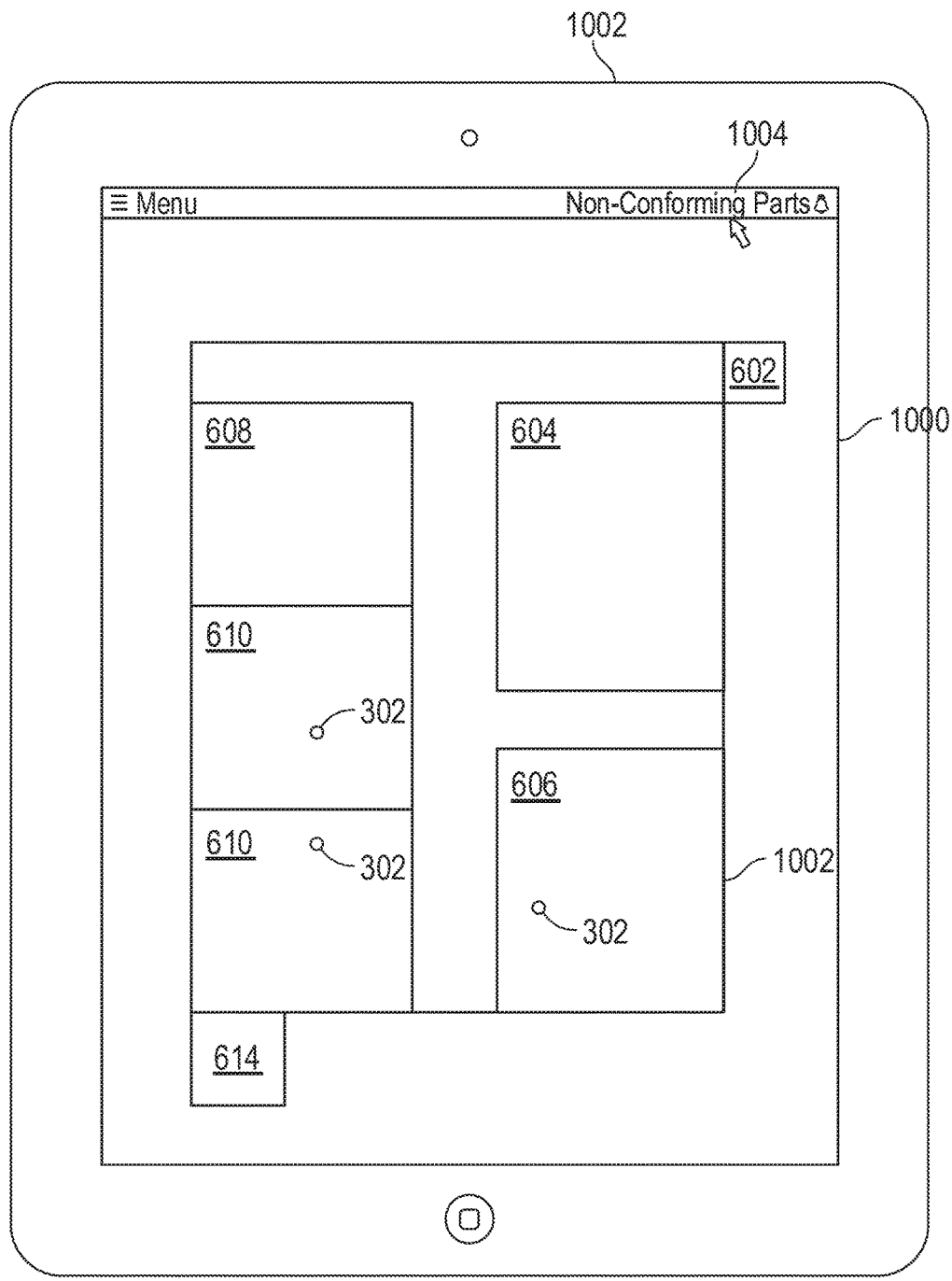
FIG. 10 is a diagram of a user interface presenting a graphical representation of non-conforming parts located in work areas of the manufacturing facility in accordance with some of the disclosed embodiments.

FIG. 10 is a diagram of a UI 1000 presenting a graphical representation on a mobile device 1002 in accordance with some of the disclosed embodiments. The UI 1000 shows work areas 602-614 in the manufacturing facility. As previously discussed, a monitoring server tracks the locations of parts in the manufacturing facility and manages work orders for the parts. The work orders may deem a particular part too defective or otherwise non-conforming to particular quality standards. For example, a part may have been machined beyond a threshold, may have failed a quality test, or may have come from a defective batch of manufactured parts. These non-conforming parts 202 may be identified by the monitoring server in the associated work orders, and the UI 1000 provides workers with a UI option 1004 to identify non-conforming parts in the manufacturing facility. Selection of the UI option 1004 causes the UI 1000 to display representations of the non-conforming parts 202.

Figure 11:
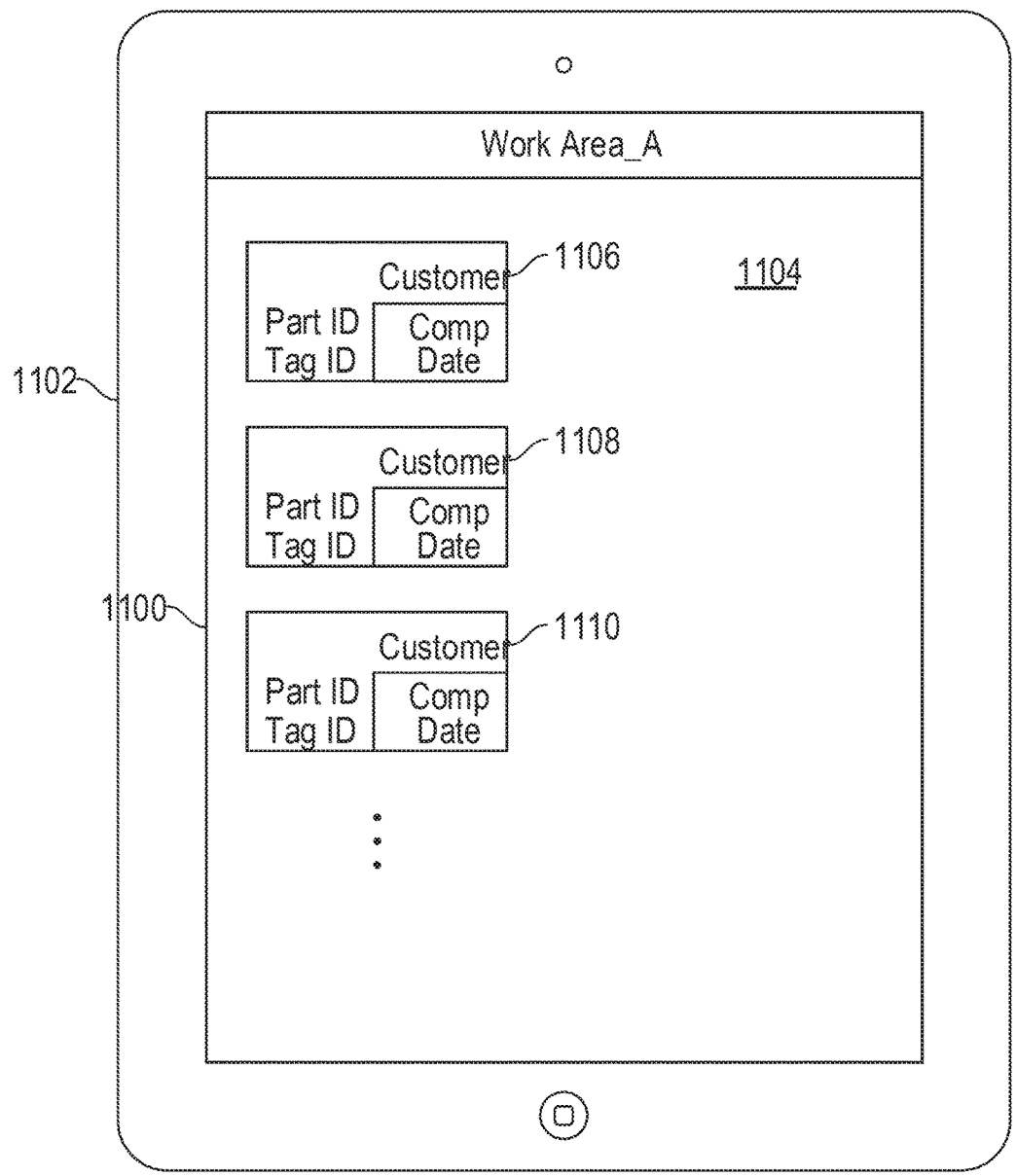
FIG. 11 is a diagram of a user interface presenting a graphical representation of currently located parts in a particular work area of a manufacturing facility in accordance with some of the disclosed embodiments.

FIG. 11 is a diagram of a UI 1100 presenting a graphical representation on a mobile device 1102 of currently located parts in a particular work area of a manufacturing facility in accordance with some of the disclosed embodiments. The UI 1100 shows UI representation 1106-1110 of the parts currently tracked by a monitoring server located in a specific work area (i.e., Work_Area_A). In one embodiment, the UI representations 1106-1110 provide snapshots of work orders for the represented parts and are interactive so that a user can obtain the underlying work orders that are being shown in addition to seeing relevant work-order information at a glance.

Figure 12:
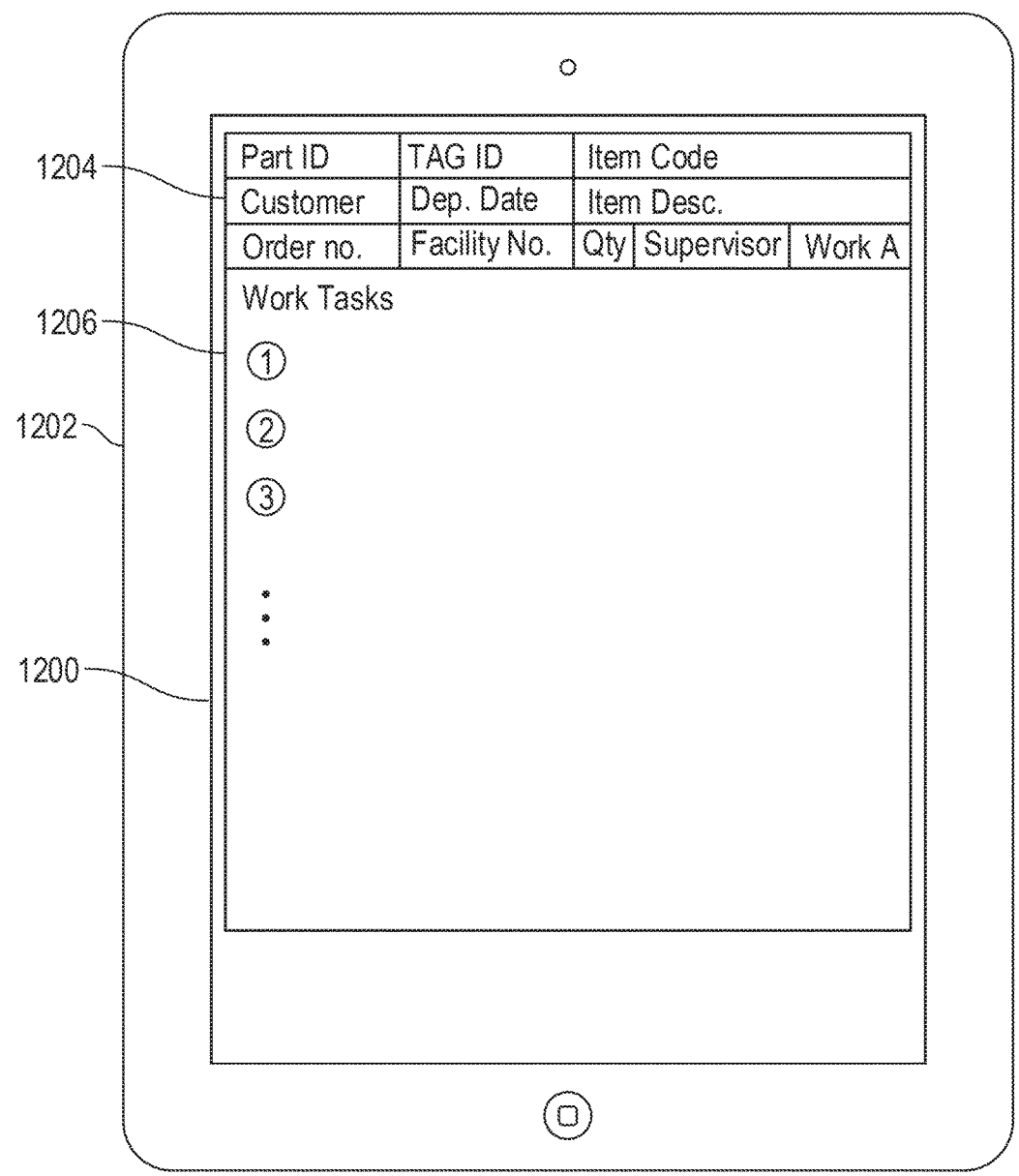
FIG. 12 is a diagram of a user interface presenting one example of a work order that may be of a work order for a part that has been identified by a mobile device in accordance with some of the disclosed embodiments.

FIG. 12 is a diagram of a UI 1200 presenting a graphical representation on a mobile device 1202 of one example of a work order in accordance with some of the disclosed embodiments. The UI 1200 includes multiple UI portions. A header UI portion 1204 lists various information about a particular part, e.g., a part ID, a tag ID, an item code, a customer name or identifier, a shipping departure date, an item description, an order number, a facility number, a quantity, a supervisor name, and a work area (shown as WORK A). Additionally, work tasks are listed in a work task UI portion 1206.

FIG. 13 is a diagram of a UI 1300 presenting a graphical representation of a work order for a part that has been identified by a mobile device 1302 upon reading a location tag in accordance with some of the disclosed embodiments. The UI 1300 includes a header UI portion 1303 providing various header information for the part. As shown, such header information may include, without limitation, a work week 1304, a customer order (CO) number 1306, an item code 1308, an item description 1310, an item name (shown as "valve body") 1312, a customer name 1314, a departure date 1316, a customer required delivery date 1318, an estimated work date (e.g., date the part will be next operated on), a customer quantity number 1322, a related part ID 1324, an order type 1326, and order number 1328, a type of order 1328, an order ID 1328, an order destination 1330 (e.g., address), an order number 1332, a facility location 1334, a manufacturing order (MO) or PO quantity 1338, a planner or customer relationship manager 1340, a worker or supervisor 1342, or any other data relevant to the part or its destined customer.

Figure 14:
FIG. 14 is a diagram of a user interface presenting a work order that may be displayed on a mobile device in accordance with some of the disclosed embodiments.

FIG. 14 is a diagram of another example of a work order that may be displayed on a mobile device, according to one embodiment. As shown, the work order 1400 includes a bar code ID 1402 that uniquely identifies the part and may be read by a bar-code reader. In one embodiment, the part ID is encoded as the bar code 1402. Alternative embodiments may encode the part name, part manufacturer, order number, customer number, date and time stamps, part serial number, or a combination thereof. An MO number 1404 indicates a particular manufacturing order, and a CO number 1406 indicates part order's prospective customer. The part's tag ID is identified by tag ID 1408. A product number 1410 and product description 1412 are listed to indicate either the part individually or the assembled part to which the part is a constituent—e.g., a valve hand wheel to an assembled valve. Production and quality control information 1416 may be listed, including, for example but without limitation, time stamps of quality control checks, responsible personnel, test values for the part, or the like. Similarly, testing and certification data 1418 may be displayed, e.g., certificate of compliance (C of C), certified mill test reports (CMTRs), heat values, and the like.

Various required manufacturing or service inspection and performance metrics 1420 may be listed. Examples of such metrics include, without limitation, magnetic particle inspection results, liquid penetrant inspection results, welding specifics, hardfacing results, minimum wall thicknesses or measurements, weld end drawing documents, or any other particular manufacturing or servicing inspection and performance metrics.

Additionally or alternatively, manufacturing or servicing procedures 1422, work tasks 1424, and additional notes 1426 may also be provided. The procedures 1422 represent the various areas operational stages and applicable data or drawing sheets for manufacturing or servicing the part. The data or drawing sheets may be linked to the manufacturing order 1000 in some embodiments, or provided separately in other embodiments. Job tasks 1024 and related job-task details are also shown. Such details may include, for example but without limitation, run times and dates of specific tests or tasks, task-performing or task-supervising worker initials, or other relevant information to ensure work tasks 1424 are completed efficiently and safely. Notes 1426 may be entered on interactive computing devices (e.g., mobile phone, mobile tablet, testing device, laptop, etc.) and stored with the manufacturing order 1400, thereby making the notes 1426 accessible to viewers on mobile devices.

Tracking the real-time locations of parts provides numerous benefits over conventional manufacturing part-tracking systems. Using the wireless beacons described herein as trackers of parts eliminates the need to constantly hunt down paperwork to determine where parts are located. This saves worker time and increases worker production. Tracking parts electronically eliminates many costly and unsafe human errors associated with inaccurately filling out paperwork or otherwise noting when and where parts have been moved.

The various embodiments discussed herein function do not require user interaction to track parts. In some embodiments, location signals containing various identifiers and/or sensor data are used by the monitoring servers discussed herein to locate parts, eliminating the need for users to maintain paperwork and providing a way to track parts electronically.

The various embodiments also greatly enhance safety in manufacturing facilities with large machinery, because the electronic part-tracking system components disclosed herein largely reduce the amount of time workers need to spend hunting for parts in work areas in which they are not working and running paperwork to and from offices for proper storage. Thus, the various embodiments help keep workers put in their respective work areas, thereby reducing worker traffic in the manufacturing facility and diminishing work accidents caused by heavy machinery that has to move throughout the facility. For example, a worker who spends more time in a welding area is at less risk at getting struck by a forklift carrying parts between other work areas of a facility. Moreover, along the lines of safety, some parts in manufacturing facilities may be hazardous (e.g., in a nuclear-part facility) and only allowed to be handled or exposed to certain accredited workers. Reducing the amount of workers straying out of their respective work areas reduces the number of people accidentally coming into contact with parts they are not trained to handle.

Additionally, the embodiments disclosed herein allow manufacturing facilities to tighten up their safety programs. Tracking parts through a given facility allows safety managers to get a better understanding of where work bottlenecks occur. Once these are understood, work areas can be easily reorganized for more efficiency and to enhance safety.

The use of wireless beacons that only transmit location signals upon sensed events allows some embodiments to greatly reduce the amount of battery power needed by the wireless beacons disclosed herein to track parts in a facility. Also, the transmission of sensor data as part of the location signals, along with various part or beacon identifiers, provides a highly accurate way to locate parts in a manner that does not require human interaction.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The subject matter disclosed herein is described with specificity to meet statutory requirements. The description itself is not intended to limit the scope of this patent. Rather, the inventor has contemplated that the claimed subject matter might also be embodied in other ways, to include different steps or combinations of steps similar to the ones described in this document, in conjunction with other present or future technologies. Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

What is claimed is:

1. A method for tracking parts in a facility, the method comprising:
   storing a beacon identifier in a wireless beacon attached to a first part moving through the facility;
   retrieving, by the wireless beacon attached to the first part moving through the facility, a tag identifier stored in a location tag attached to a second part moving through the facility, wherein the first part is distinct from the second part, and wherein the first part and the second part are coupled together as constituent parts of a manufacturing item moving through the facility;
   generating, on the wireless beacon attached to the first part, a location signal comprising:
   (1) the beacon identifier of the wireless beacon attached to the first part moving through the facility, and
   (2) the tag identifier of the location tag attached to the second part moving through the facility; and
   transmitting, from the wireless beacon attached to the first part, the location signal comprising both the beacon identifier of the wireless beacon attached to the first part and the tag identifier of the location tag attached to the second part to one or more receivers for tracking locations of the first part and the second part in the facility.

2. The method of claim 1, further comprising retrieving a part identifier from the location tag and adding the part identifier to the location signal, wherein the part identifier is unique to the second part.

3. The method of claim 2, further comprising:
   submitting the part identifier to a monitoring server in a request for work orders related to the second part;
   receiving at least one work order related to the second part; and
   presenting on a mobile device to a user the at least one work order related to the second part.

4. The method of claim 1, further comprising determining real-time locations in the facility of the first part and the second part using the location signal received from the wireless beacon.

5. The method of claim 4, further comprising presenting a user interface showing the real-time locations of the first part and the second part being in one or more work areas in which the first part and the second part are located.

6. The method of claim 1, further comprising transmitting the location signal to receiver devices in the facility through radio frequency transmission.

7. The method of claim 1, wherein the wireless beacon attached to the first part retrieves the tag identifier from the location tag incident to the wireless beacon detecting the location tag being within a communicable distance of the wireless beacon.

8. The method of claim 1, further comprising:
   receiving the location signal from a receiver device;
   determining the location of the second part based on the location signal; and
   updating or creating a work order for the second part based on the location signal or the location of the second part.

9. The method of claim 1, wherein the first part or the second part comprise at least a member of a group comprising: a fluid end, a swivel, a joint, a valve, a hose, a conduit, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a butterfly valve, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, a casing head, a tubing head, a positive displacement pump, a hydrocyclone, a dewatering pump, a vortex pump, a trailer, a conveyor, a screening machine, a material handling machine, a communition machine, a feeder, a crusher, a modular plant, a barge, or a control valve.

10. The method of claim 1, further comprising:
determining, based on the location signal having both the beacon identifier of the wireless beacon attached to the first part and the tag identifier of the location tag attached to the second part, that the first part and the second part have been assembled together.

11. The method of claim 1, further comprising:
capturing sensor data from one or more sensors of the wireless beacon;
determining a threshold sensor event; and
including at least a portion of the sensor data as part of the location signal.

12. The method of claim 11, wherein the one or more sensors comprise at least one member of a group comprising a magnetometer, a pressure sensor, a photometer, a thermometer, a global positioning sensor (GPS) sensor, a gyroscope, and a rotational vector sensor.

13. The method of claim 1, wherein the tag identifier is a media access control address specific to the location tag.

14. One or more computer-storage memories with stored computer-executable instructions configured to cause one or more processors to track locations of a first part and a second part in a facility, wherein a wireless beacon is attached to the first part and a location tag is attached to the second part, the one or more computer-storage memories comprising:
a location signal generated by the wireless beacon, which is attached to the first part in the facility, that is received over a network from at least one stationary receiver device, wherein the location signal generated by the wireless beacon comprises:
(1) a beacon identifier of the wireless beacon attached to the first part, and
(2) a tag identifier captured by the wireless beacon through a near-field communication transmission of a location tag coupled to a second part that is distinct from the first part; and
a part location component configured to use the location signal generated by the wireless beacon to determine and store real-time locations in the facility of the first part and the second part, wherein the first part and the second part are coupled together as constituent parts of a manufacturing item moving through the facility.

15. The one or more computer-storage memories of claim 14, wherein the part location component is configured to transmit the real-time locations of the first part and the second part to a computing device for display.

16. The one or more computer-storage memories of claim 14, wherein the first part and the second part each comprise one member of a group comprising: a fluid end, a swivel, a joint, a valve, a hose, a conduit, a manifold trailer, safety iron, a safety hammer, a dart valve, a plug valve, a clapper check valve, a pressure relief valve, an emergency unloading valve, a gate valve, a subsea dosage valve, a hydraulic valve, a valve seat, a steadseal valve, a hyperseal valve, a Polytetrafluoroethylene-lined valve, a swingthrough valve, a rubber-sealing valve, a rubber-line valve, a fire safe valve, a swing and lift check valve, a T-pattern globe valve, a Y-pattern globe valve, a three-way globe valve, a compressor check valve, a cold reheat check valve, a cold heat check valve, a testable check valve, a reverse current valve, a parallel slide valve, a gate valve, a safety valve, a safety relief valve, an isolation valve, a relief valve, a mounted-ball valve, a ball valve, a diaphragm valve, a butterfly valve, a gate and globe valve, a check valve, a lift check valve, a swing check valve, a steam isolation valve, a feedwater isolation valve, an integrated safety valve, a single-stage turbine, a multi-stage turbine, a hydraulic turbine, a pump turbine, a quad-runner turbine, a gear operator, a pneumatic actuator, a pressure control panel, a lifting clamp, a flow line safety restraint, a choke, a drop ball injector, a pump, a blowout preventer, a gas separator, an overshot connector, a wellhead, a frac pump, a manifold system, a fluid end system, a slurry pump, a water pump, a subsea pump, a premix tank, a frac tree, a swellable packer, a manifold skid, a tubing head, a wellhead, a rod rotator, a stuffing box, a casing head, a tubing head, a positive displacement pump, a hydrocyclone, a dewatering pump, a vortex pump, a trailer, a conveyor, a screening machine, a material handling machine, a communition machine, a feeder, a crusher, a modular plant, a barge, and a control valve.

17. A method for tracking a first part and a second part in a facility, wherein a location tag is attached to the first part and a wireless beacon is attached to the second part, wherein the first part and the second part are moving through the facility, the method comprising:
receiving, at a computing device, a wireless signal from the wireless beacon attached to the second part moving through the facility, the wireless signal comprising:
a tag identifier of the location tag or a first part identifier of the first part to which the location tag is attached, and
a beacon identifier of the wireless beacon or a second part identifier of the second part to which the wireless beacon is attached,
wherein the tag identifier or the first part identifier are wirelessly retrieved from the location tag by the wireless beacon,
wherein the first part is distinct from the second part, and
wherein the first part and the second part are coupled together as constituent parts of a manufacturing item moving through the facility;
generating, at the computing device, a work-order request that includes:
the tag identifier of the location tag or the first part identifier of the first part, and
the beacon identifier of the wireless beacon attached to the second part;
transmitting the work-order request over a network;
receiving a work order from a monitoring server in response to the work-order request; and
presenting the work order on a display.

18. The method device of claim 17, wherein the transmitter is a near-field communication transmitter.

19. The method of claim 17, further comprising:
receiving user input, on the display, from a user interacting with the work order.

20. The method of claim 19, further comprising:
transmitting the user input to the monitoring server; and
modifying the work order based on the user input.

* * * * *